(12) United States Patent
Ishii et al.

(10) Patent No.: US 7,027,616 B2
(45) Date of Patent: Apr. 11, 2006

(54) MONITORING SYSTEM

(75) Inventors: Hirofumi Ishii, Kanagawa (JP);
Shusaku Okamoto, Osaka (JP);
Masamichi Nakagawa, Osaka (JP);
Kunio Nobori, Osaka (JP); Atsushi Morimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 765 days.

(21) Appl. No.: 09/898,335

(22) Filed: Jul. 3, 2001

(65) Prior Publication Data

US 2002/0034316 A1 Mar. 21, 2002

(30) Foreign Application Priority Data

Jul. 4, 2000 (JP) .............................. 2000-201948

(51) Int. Cl.
*G06K 9/00* (2006.01)

(52) U.S. Cl. ...................... 382/104; 348/148; 348/153; 348/222.1; 358/450; 358/538; 358/540; 382/234; 382/235; 382/282; 382/284

(58) Field of Classification Search ................ 340/435, 340/461, 462, 468, 932, 933, 937; 348/118, 348/142, 143, 148–149, 152, 158–159, 153, 348/222.1; 382/103, 104, 235–236, 250, 382/234, 282, 284; 386/109, 123–124; 455/72, 455/99, 552.1, 569.2; 701/24, 28, 33, 117, 701/30; 358/450, 538, 540
See application file for complete search history.

(56) References Cited

U.S. PATENT DOCUMENTS 4,855,812 A * 8/1989 Rokuda et al. ............. 348/566

5,216,502 A * 6/1993 Katz ........................ 348/150

(Continued)

FOREIGN PATENT DOCUMENTS

EP 0 920 211 A 6/1999
JP 10-105695 4/1998

OTHER PUBLICATIONS

Gil-Whoan Chu et al.; An Optimal Image Selection from Multiple Cameras Under the Limitation of Communication Capacity; Multisensor Fusion and Integration for Intelligent Systems; 1999; MFI '99 Proceedings; 1999 IEEE/SICE/RSJ International Conference on Taipei, Taiwan; Aug. 15-18, 1999; Piscataway, NJ, USA; IEEE; U.S. Aug. 15, 1999; pp. 261-266; XP010366576; ISBN: 0-7803-5801-5.
European Search Report for Application No. 01 11 6108; Mailed Dec. 1, 2003.

*Primary Examiner*—Sanjiv Shah
*Assistant Examiner*—Gregory Desire
(74) *Attorney, Agent, or Firm*—Harness, Dickey & Pierce, P.L.C.

(57) ABSTRACT

In transmitting image data from multiple cameras to an image processing section to produce a synthesized image from respective camera images, the amount of data transmitted through a transmission path can be cut down without sacrificing the quality of the synthesized image. In accordance with a correspondence between the synthesized and camera images as described on a mapping table, a resolution specifier specifies resolutions, which should be necessary for image synthesis, for respective areas of each camera image. A compressor, provided for each of the cameras, compresses the associated camera image data according to the resolutions specified. In this manner, the image data, which has been compressed in accordance with the correspondence between the synthesized and camera images, is transmitted through the transmission path.

7 Claims, 19 Drawing Sheets

U.S. PATENT DOCUMENTS

| | | | |
|---|---|---|---|
| 5,581,377 A * | 12/1996 | Shimizu et al. | 358/540 |
| 6,011,901 A * | 1/2000 | Kirsten | 386/123 |
| 6,154,658 A * | 11/2000 | Caci | 455/466 |
| 6,223,125 B1 * | 4/2001 | Hall | 701/301 |
| RE37,709 E * | 5/2002 | Dukek | 348/148 |
| 6,389,339 B1 * | 5/2002 | Just | 701/33 |
| 6,420,977 B1 * | 7/2002 | Corbitt et al. | 340/937 |
| 6,493,466 B1 * | 12/2002 | Honda et al. | 382/236 |
| 6,597,389 B1 * | 7/2003 | Tanaka et al. | 348/14.08 |
| 6,624,845 B1 * | 9/2003 | Loyd et al. | 348/151 |
| 6,693,519 B1 * | 2/2004 | Keirstead | 340/435 |
| 6,912,001 B1 * | 6/2005 | Okamoto et al. | 348/222.1 |

* cited by examiner

<camera 1>

<synthesized image>

⟨necessary resolutions⟩

⟨camera 1⟩

<camera 1>

IM1

FIG. 16A ⟨camera 1⟩
synthesized image map
FIG. 16B ⟨necessary area⟩
ANE
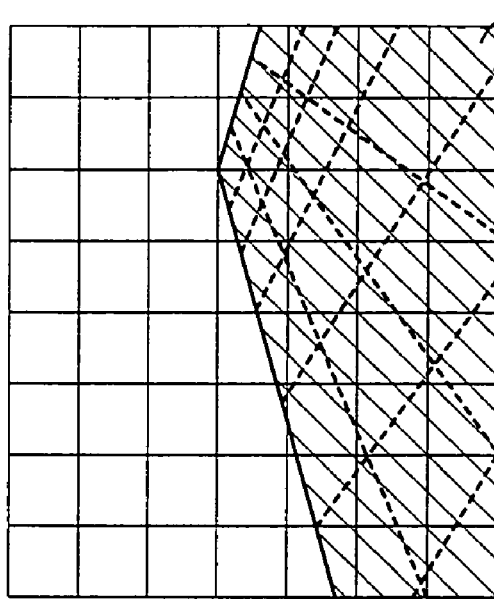
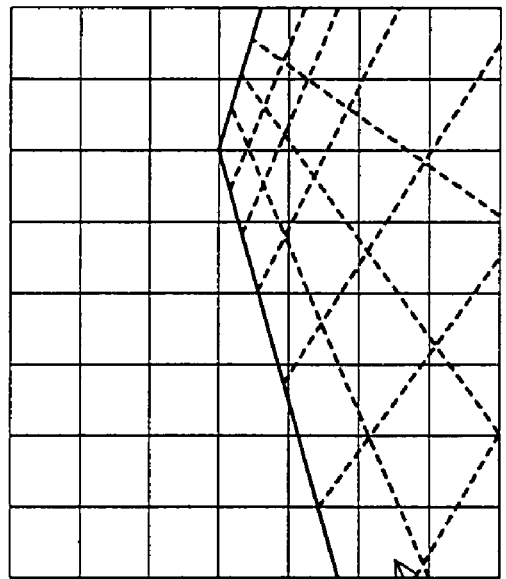

MONITORING SYSTEM

BACKGROUND OF THE INVENTION

The present invention relates to an image processing technique for synthesizing images, taken by multiple cameras, through various types of processing including deformation and integration. More particularly, the present invention relates to a technique effectively applicable to a monitoring system as an aid for vehicle driving operations, for example.

Recently, car-mounted display devices have been more and more popularized and the prices of video capturing devices, including video cameras, have been reduced drastically. Reflecting such tendencies, a system usable as a safety check aid for a vehicle driver by allowing him or her to monitor the vehicle's surroundings using video cameras is now available at a reasonable price and is being popularized now.

A system as disclosed in Japanese Patent Application No. 10-217261 is an exemplary vehicle surrounding monitoring system of that type. Specifically, the system combines together images that have been taken by multiple cameras mounted on a vehicle to produce a synthesized image, which looks as if the vehicle were seen from a virtual viewpoint located over the vehicle, and then presents the virtual image to the driver.

FIG. 19 illustrates an exemplary configuration for a system of that type. As shown in FIG. 19, the system includes: camera section 40 made up of multiple cameras 401; image processing section 50 coupled to the camera section 40 via transmission lines 45; and display device 60. The image processing section 50 includes: buffer memories 501 associated with the respective cameras 401; mapping table 502 describing a relationship between a synthesized image that should look as such to a virtual viewpoint and the images actually taken by the cameras 401; and image synthesizer 503. Each of the cameras 401 included in the camera section 40 outputs an image signal on a field-by-field or frame-by-frame basis. The image signal output is transmitted through associated one of the transmission lines 45 and then stored on associated one of the buffer memories 501. By reference to the data stored on the mapping table 502, the image synthesizer 503 combines together the images signals, read out from the buffer memories 501, to produce a synthesized image and present it on the display device 60. By looking at the synthesized image produced by the system shown in FIG. 19, the user (i.e., the driver of a vehicle) can know an exact positional relationship between his or her own vehicle and the vehicle's surroundings without taking the actual positions of the cameras into consideration. Accordingly, this system allows the driver to park his or her vehicle much more safely, for example.

The system of this type, however, has the following drawbacks.

As shown in FIG. 19, each of the transmission lines 45 is associated with one of the cameras 401. That is to say, the same number of transmission lines 45 as that of the cameras 401 should connect the cameras 401 to the image processing section 50. Normally, the cameras 401 are mounted at various positions of a vehicle to produce a synthesized image representing the vehicle's surroundings. Accordingly, the vehicle should be wired with the transmission lines 45 here and there. As a result, it takes too much time and trouble to install this system on the vehicle. Also, such a system requires a great deal of maintenance to avoid failures, for example.

Stated otherwise, to make the system more easily installable and maintainable, the number of transmission lines should be reduced by getting one transmission line shared by multiple cameras. However, it usually takes a huge channel capacity to transfer the image data of each camera entirely. For that reason, it would be hard for a reduced number of transmission lines to cope with such a tall demand. That is to say, to reduce the number of transmission lines, there is no other choice than cutting down the amount of image data to be transferred.

Also, the image processing section 50 needs to store that huge amount of image data that has been transferred from the cameras 401 on a field-by-field or frame-by-frame basis. Thus, each of the buffer memories 501 should have a great storage capacity.

Furthermore, although a synthesized image is produced from a plurality of images taken by multiple cameras, not all of each camera image is used for the image synthesis but each image contains some unnecessary parts. Moreover, even in an image area required for the image synthesis, some part of the area should show a resolution different from that of another during the image synthesis process. Accordingly, it is not always necessary to transmit the entire image data of each camera image as it is to the image processing section.

SUMMARY OF THE INVENTION

An object of this invention is providing a monitoring system that includes multiple cameras and an image processing section for producing a synthesized image from the images taken by the cameras and that can drastically reduce the amount of image data to be transmitted without sacrificing the quality of the synthesized image.

Specifically, a monitoring system according to the present invention includes camera section, transmission path and image processing section. The camera section includes multiple cameras and image data cutdown means. The image data cutdown means reduces the amount of original image data representing camera images captured by the cameras. The camera section outputs the reduced image data. The transmission path transmits the reduced image data that has been output from the camera section. The image processing section receives the reduced image data through the transmission path and produces a synthesized image from the reduced image data. The camera section or the image processing section includes cutdown mode selecting means for selecting a cutdown mode, in which the original image data for use in image synthesis has its amount cut down, for the image data cutdown means in accordance with a correspondence between the synthesized and camera images.

According to the present invention, the image data cutdown means, provided for the camera section, reduces the amount of original image data in compliance with the cutdown mode selected by the cutdown mode selecting means. Then, the camera section outputs the reduced image data onto the transmission path. Also, the cutdown mode selecting means selects the cutdown mode, in which the original image data for use in image synthesis has its amount cut down, in accordance with the correspondence between the synthesized and camera images. Accordingly, the image data, which has had its amount cut down in the cutdown mode selected in accordance with the correspondence between the synthesized and camera images, is transmitted through the transmission path. In this manner, the amount of camera image data to be transmitted can be reduced drastically without sacrificing the quality of the resultant synthesized image. As a result, the transmission path used may have a reduced channel capacity. So the transmission path is implementable as a smaller number of less expensive transmission lines or even as a wireless path. Thus, the transmission path is much easier to mount on a vehicle or requires maintenance much less often. In addition, a buffer memory needed for the image processing section may have a much reduced storage capacity.

In one embodiment of the present invention, the image processing section may selectively produce any of multiple types of synthesized images and change the types of the synthesized images to be produced. The cutdown mode selecting means may change the cutdown modes according to the type of the synthesized image to be produced by the image processing section.

In another embodiment of the present invention, the cutdown mode selecting means may include a resolution specifier for specifying resolutions that should be necessary for respective areas of each said camera image for use in the image synthesis to produce the synthesized image. In that case, the image data cutdown means preferably compresses the original image data, representing the camera images for use in the image synthesis, according to the resolutions specified by the resolution specifier. In this particular embodiment, the image data cutdown means preferably compresses the original image data by discrete cosine transform.

In such an embodiment, the original image data has its amount reduced greatly by being compressed according to the resolutions that should be necessary for image synthesis, and then image data in the reduced amount is transmitted. Accordingly, the transmission path may have a much smaller channel capacity. In addition, it is also possible to suppress the aliasing distortion, thus improving the quality of the resultant synthesized image.

In an alternative embodiment, the cutdown mode selecting means may include an area specifier for specifying areas that should be necessary to produce the synthesized image for each said camera image for use in the image synthesis. In that case, the image data cutdown means preferably removes an unnecessary part from the original image data that represents each said camera image for use in the image synthesis. The unnecessary part corresponds to the remaining area of the camera image other than the areas specified by the area specifier.

In such an embodiment, the original image data has its amount reduced drastically before the transmission because the unnecessary part of the original image data, corresponding to the excessive area thereof other than the areas necessary for image synthesis, is removed. Accordingly, the transmission path may have a much smaller channel capacity.

In yet another embodiment, the original image data may be read out from each said camera in an externally controllable order. In that case, the camera section or the image processing section preferably includes a readout controller for controlling the order, in which the original image data representing each said camera image for use in the image synthesis is read out, in compliance with the cutdown mode selected by the cutdown mode selecting means.

Then, the camera images for use in image synthesis will be read out in the order that has been controlled in compliance with the cutdown mode selected. Accordingly, it is possible to prevent too much data from being transmitted through the transmission path within a limited period of time. Rather, the image data can be transmitted dispersively.

In yet another embodiment, the cameras are preferably mounted on a vehicle to capture images of the vehicle's surroundings.

BRIEF DESCRIPTION OF THE DRAWINGS

FIGS. 16A and 16B illustrate an area necessary for image synthesis.

DESCRIPTION OF THE PREFERRED EMBODIMENTS

Hereinafter, preferred embodiments of the present invention will be described with reference to the accompanying drawings.

Embodiment 1

Figure 1:
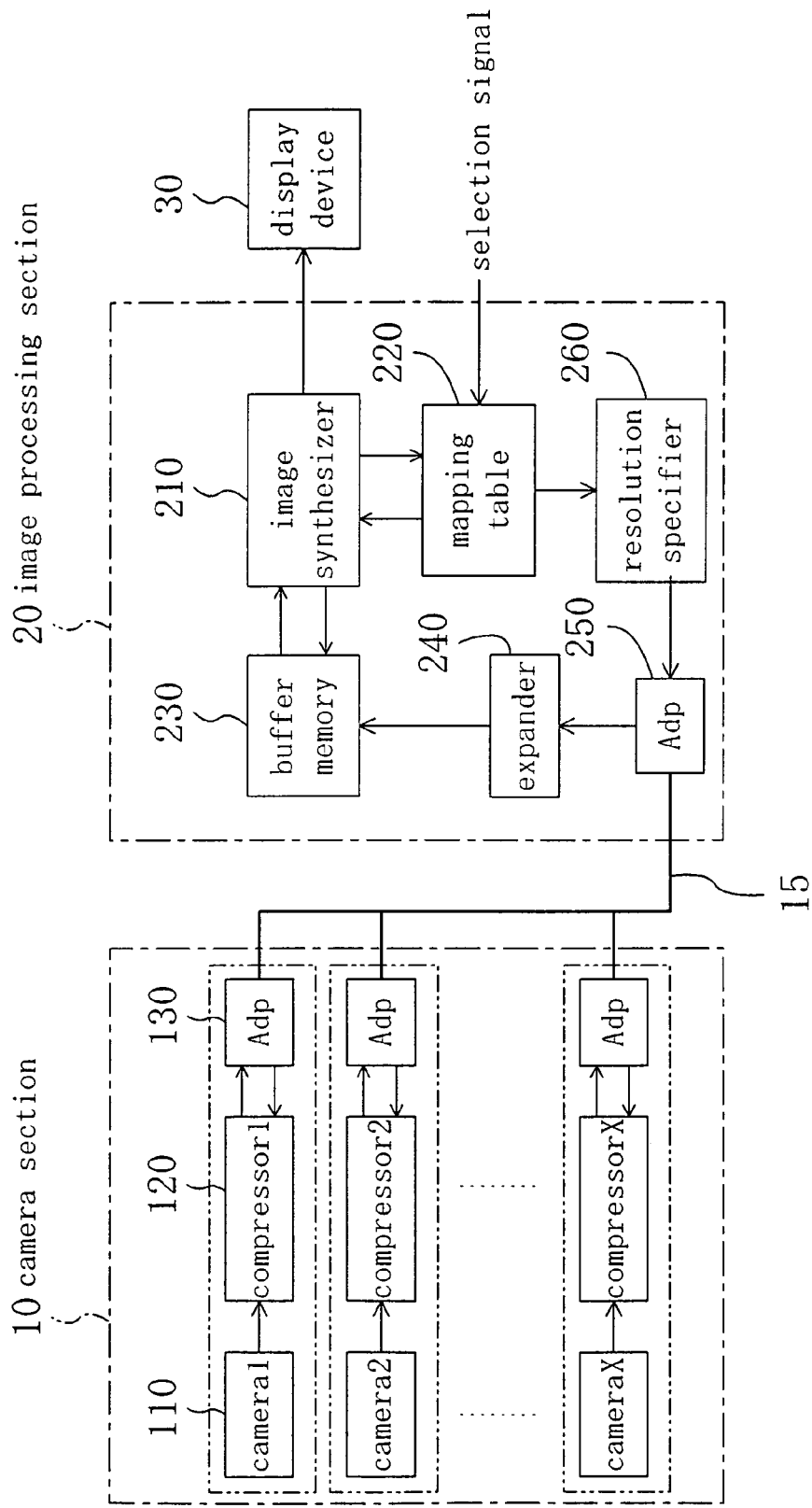
FIG. 1 is a block diagram illustrating a configuration for a monitoring system according to a first embodiment of the present invention.

FIG. 1 is a block diagram illustrating a configuration for a monitoring system according to a first embodiment of the present invention. The monitoring system shown in FIG. 1 is supposed to be mounted on a vehicle and used as an aid for vehicle driving operations (e.g., parking). Specifically, this system combines together images that have been taken by multiple cameras mounted on a vehicle to produce a synthesized image, which looks as if the vehicle were captured by a camera located over the vehicle, for example. Then, the system presents the virtual image to the driver. By looking at the synthesized image presented, the driver can know an exact positional relationship between his or her own vehicle and its surroundings, and can park his or her vehicle much more safely, for example.

As shown in FIG. 1, the monitoring system includes camera section 10, transmission line 15, image processing section 20 and display device 30. The camera section 10 includes a number X of cameras 110 (i.e., cameras No. 1 through No. X), each of which is integrated together with a compressor 120 and a transmission adapter (Adp) 130. The compressor 120 compresses an image taken by its associated camera 110. The image data, representing the respective images taken by these cameras 110, is output from the camera section 10, transmitted through the transmission line 15 and then input to the image processing section 20. That is to say, the transmission line 15 serves as a transmission path that connects the camera and image processing sections 10 and 20 together. On receiving the image data, the image processing section 20 performs various types of processing (including deformation and integration) on the image data, thereby producing a synthesized image and presenting it on the display device 30.

Figure 2:
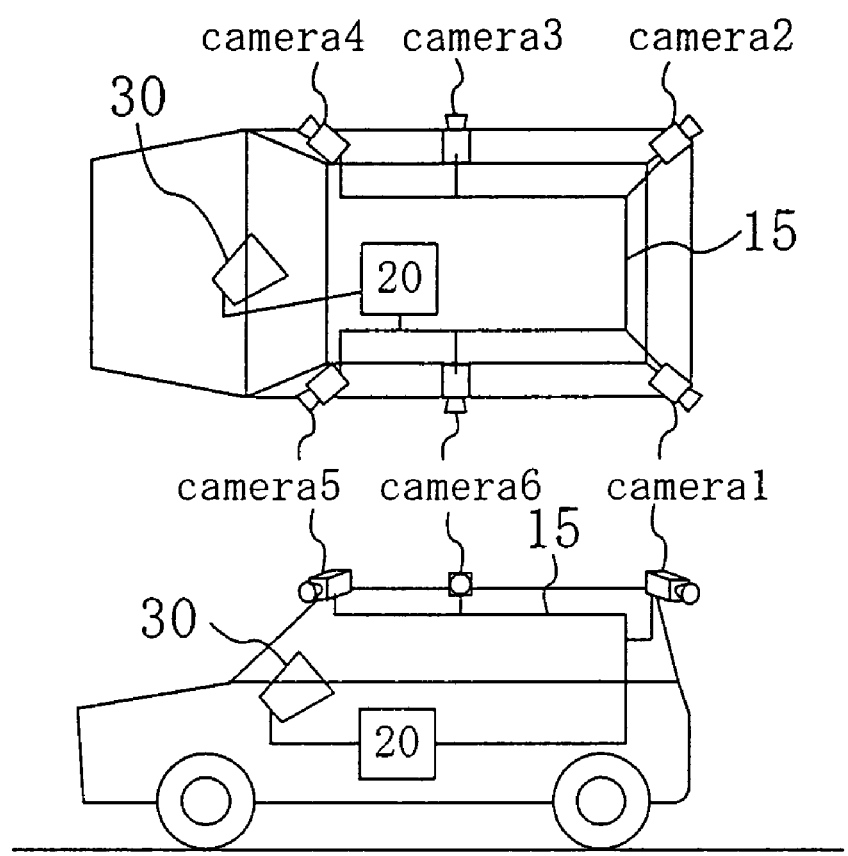
FIG. 2 illustrates an exemplary arrangement of cameras on a vehicle.
Figure 3:
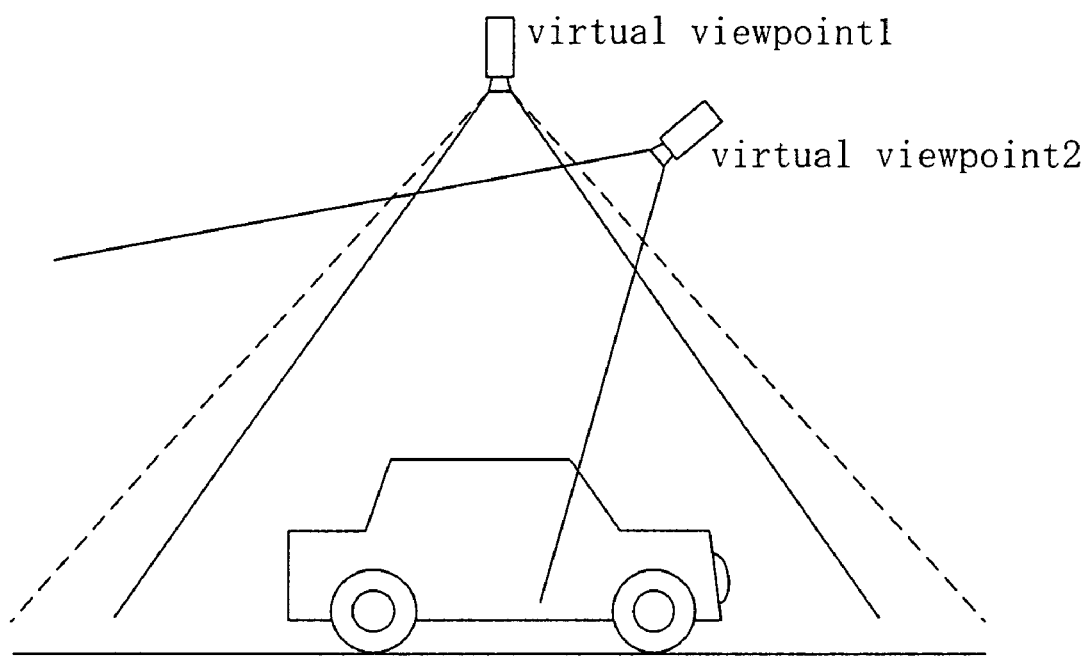
FIG. 3 illustrates exemplary positions of virtual viewpoints for synthesized images.

FIG. 2 illustrates an exemplary arrangement of cameras in accordance with this embodiment. In the example illustrated in FIG. 2, six cameras Nos. 1 through 6 are mounted at respective positions on a vehicle. FIG. 3 illustrates exemplary positions of virtual viewpoints for synthesized images. The image processing section 20 produces a synthesized image, which looks as if the vehicle were seen from the virtual viewpoint No. 1 shown in FIG. 3, for example, from the images taken by the cameras Nos. 1 through 6.

As shown in FIG. 1, the image processing section 20 includes image synthesizer 210, mapping table 220, buffer memory 230, expander 240, transmission adapter (Adp) 250 and resolution specifier 260. The mapping table 220 stores data describing a correspondence between a synthesized image and respective camera images. The image synthesizer 210 produces a synthesized image by reference to the mapping table 220. The compressed image data is input through the transmission adapter 250 and then decompressed by the expander 240. Then, the decompressed image data is temporarily retained on the buffer memory 230. In accordance with the correspondence between the synthesized and camera images as described on the mapping table 220, the resolution specifier 260 specifies resolutions, which should be necessary to produce the synthesized image, for respective areas of each camera image. The resolution specifier 260 is exemplary cutdown mode selecting means as defined in the appended claims.

Figure 4B:
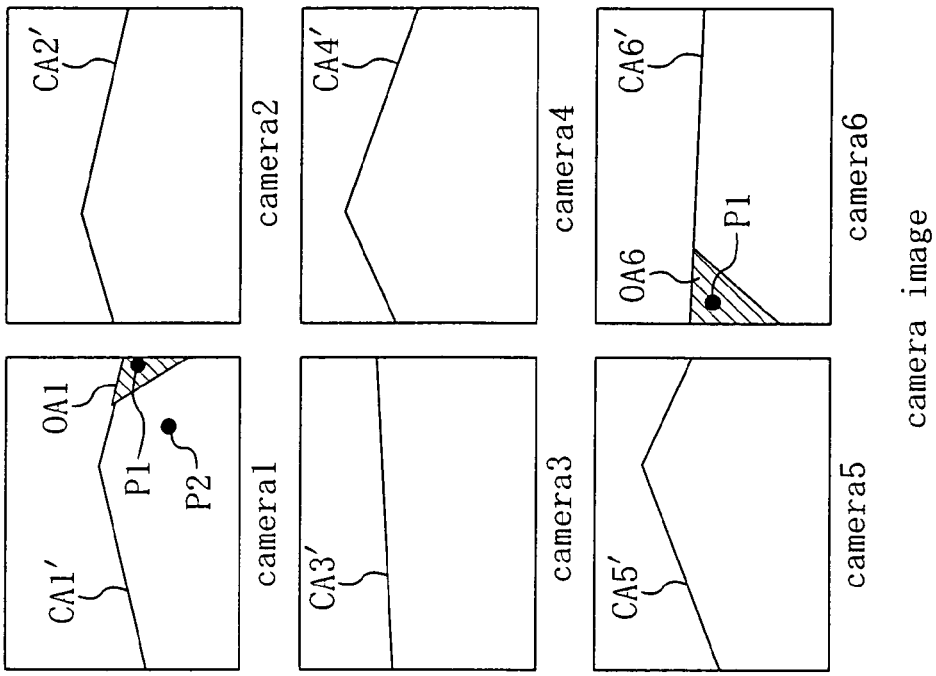
FIGS. 4A and 4B illustrate an exemplary correspondence between respective camera images and a resultant synthesized image.
Figure 4A:
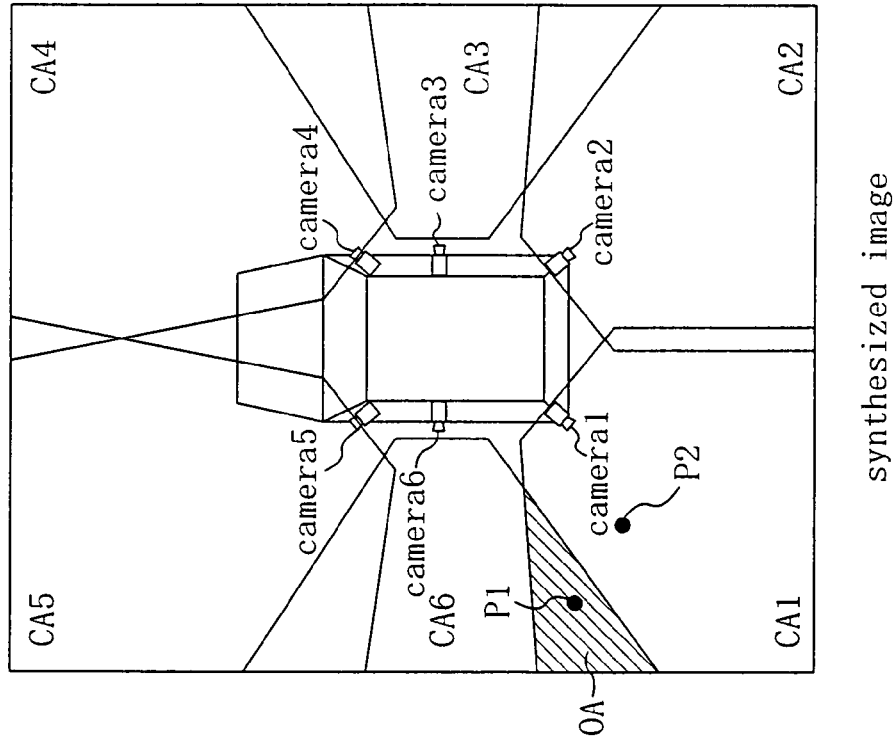

FIGS. 4A and 4B illustrate an exemplary correspondence between respective camera images and a resultant synthesized image. In the illustrated example, the synthesized image shown in FIG. 4A, which looks as if the vehicle were seen from the virtual viewpoint No. 1 shown in FIG. 3, is produced from the images taken by the cameras Nos. 1 through 6 arranged as shown in FIG. 2. As shown in FIG. 4A, the images taken by the cameras Nos. 1 through 6 will respectively occupy the areas CA1 through CA6 of the synthesized image. In the following description, the areas CA1 through CA6 will be referred to as "camera image areas" CA1 through CA6. In FIG. 4B on the other hand, the camera image areas corresponding to the areas CA1 through CA6 of the synthesized image are identified by CA1' through CA6', respectively.

The mapping table 220 stores data representing the correspondence between the synthesized and respective camera images such as that shown in FIG. 4A. That is to say, the data stored on the mapping table 220 describes camera image data associated with every set of coordinates included in the synthesized image that should look as such to the virtual viewpoint. By reference to the data stored on the mapping table 220, the image synthesizer 210 produces the synthesized image that looks as if the vehicle were seen from the virtual viewpoint.

For example, a point P1 on the synthesized image is located in an area OA in which the image areas CA1 and CA6 of the cameras Nos. 1 and 6 overlap with each other. Accordingly, pixel data is obtained for this point P1 using pixel data associated with the point P1 in the area CA1' of the camera No. 1 image and pixel data associated with the point P1 in the area CA6' of the camera No. 6 image. On the other hand, a point P2 on the synthesized image is located in the image area CA1 of the camera No. 1. Accordingly, pixel data is obtained for the point P2 using pixel data associated with the point P2 in the area CA1' of the camera No. 1 image.

Also, in accordance with the correspondence between the synthesized and respective camera images as described on the mapping table 220, the resolution specifier 260 specifies resolutions that should be necessary for image synthesis for the respective areas of each camera image. The data, representing the resolutions specified for each camera image, is transmitted through the transmission adapter 250 and transmission line 15 to a compressor 120 associated with the camera image. In accordance with the resolution data transmitted, the compressor 120 compresses the image data of the associated camera image. The compressed image data is transmitted through the transmission adapter 130 and transmission line 15 to the image processing section 20. In the image processing section 20, the compressed image data is decompressed by the expander 240 and then the decompressed image data is stored on the buffer memory 230.

Also, the mapping table 220 stores multiple sets of mapping table data that are associated with a plurality of virtual viewpoints as shown in FIG. 3. In response to a selection signal externally input, the mapping table 220 can select one of those sets of mapping table data for use in the image synthesis. In this manner, the image processing section 20 can selectively produce one of multiple types of synthesized images and can change the types of the synthesized images to be produced. The selection signal may be applied according to the gear position or the speed of a running vehicle, for example.

When the selection signal is input, the previous set of mapping table data that has been output by the mapping table 220 is replaced with another. As a result, a different type of synthesized image is produced. On receiving the newly selected set of mapping table data, the resolution specifier 260 specifies again the resolutions that should be necessary for image synthesis for respective areas of each camera image. The resolution data newly obtained is transmitted through the transmission line 15 to the compressor 120 associated with each camera image. And in accordance with the resolution data transmitted, the compressor 120 changes the modes of compression processing to be carried out.

Compression Processing

In the illustrated embodiment, each of the compressors 120 is supposed to compress the associated camera image data by discrete cosine transform (DCT).

For example, first, the compressor 120 divides its associated camera image made up of 480×720 pixels into 5400 macroblocks, each consisting of 8×8 pixels. As a result of this division, camera image data with coordinates (i, j) (where $1 \leq i \leq 480$, $1 \leq j \leq 720$) may be represented as S1 (K, L, i', j'), where K and L respectively are horizontal and vertical block address numbers, i.e., $1 \leq K \leq 60$, $1 \leq L \leq 90$, $1 \leq i' \leq 8$ and $1 \leq j' \leq 8$.

Then, each pixel data S1 (K, L, i', j') is transformed into a signal g1 (K, L, m, n) with respective frequency components by the DCT transform given by $$g1(K, L, m, n) = \frac{2}{N} C(m)C(n) \sum_{i'=1}^{N} \sum_{j'=1}^{N} S1(K, L, i', j') \cdot \cos\left[\frac{\pi K(2i-1)}{2N}\right] \cdot \cos\left[\frac{\pi L(2j-1)}{2N}\right]$$

$$(N = 8, m = 1\text{~}8, n = 1\text{~}8)$$

In this equation, a great m or n value represents a high horizontal or vertical frequency component in a macroblock. If the data representing those high-frequency components are removed, data with a low resolution can be generated easily and the camera image can be transmitted in a reduced amount. In some type of synthesized image, a horizontal resolution required may be different from a vertical resolution required. Even so, if the m and n values as thresholds for removing the excessive data are set independently, it is possible to separately control the resolutions both horizontally and vertically.

Figure 5B:
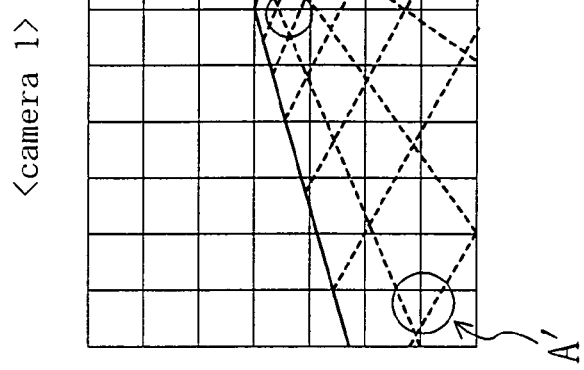
FIGS. 5A and 5B schematically illustrate a correspondence between a synthesized image and a camera image.
Figure 5A:
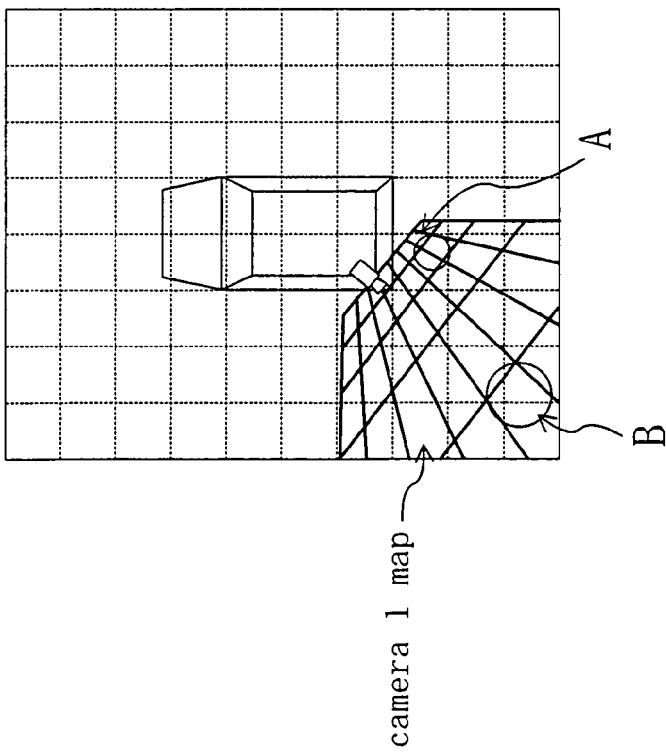

FIGS. 5A and 5B schematically illustrate a correspondence between a synthesized image and a camera No. 1 image. Specifically, FIG. 5A illustrates a map for the camera No. 1 image on the synthesized image, while FIG. 5B illustrates a map for the synthesized image on the camera No. 1 image. As shown in FIGS. 5A and 5B, the open circles A and B on the synthesized image are associated with the circles A' and B' on the camera No. 1 image. As used herein, the "map" means a lattice, which is drawn for convenience sake to clarify the correspondence between the synthesized and camera images. The lattice is drawn at regular pixel intervals in dashed lines for the synthesized image shown in FIG. 5A and in solid lines for the camera No. 1 image shown in FIG. 5B. The solid-line lattice on the camera No. 1 image also represents "blocks" as units for subsequent DCT compression. In the synthesized image shown in FIG. 5A, part of the camera No. 1 image map with a relatively high lattice density (e.g., the circle A) does not require so high a resolution for the camera No. 1 image data. On the other hand, part of the camera No. 1 image map with a relatively low lattice density (e.g., the circle B) does require a high resolution for the camera No. 1 image data. That is to say, in the camera No. 1 image shown in FIG. 5B, part of the synthesized image map with a relatively high lattice density (e.g., the circle B' associated with the circle B) does require a high resolution for the camera No. 1 image data. However, part of the synthesized image map with a relatively low lattice density (e.g., the circle A' associated with the circle A) does not require so high a resolution for the camera No. 1 image data. Also, the image data, not included in the lattice representing the synthesized image map, is not necessary for the image synthesis.

Figure 6B:
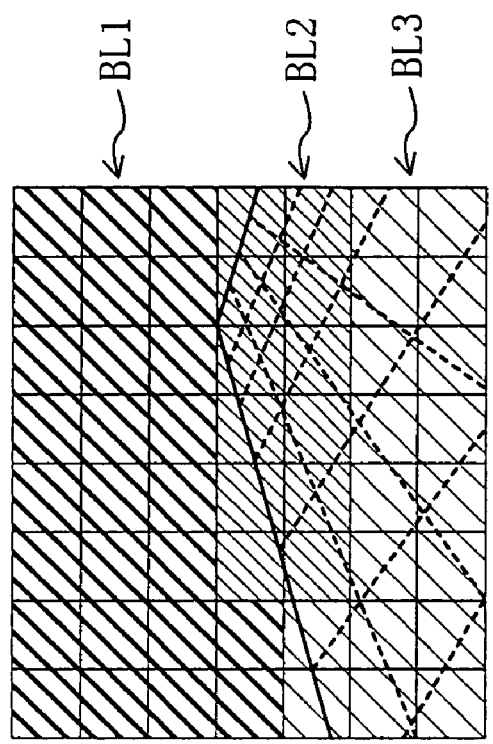
FIGS. 6A and 6B illustrate how the areas of a camera image may be classified according to resolutions.
Figure 6A:
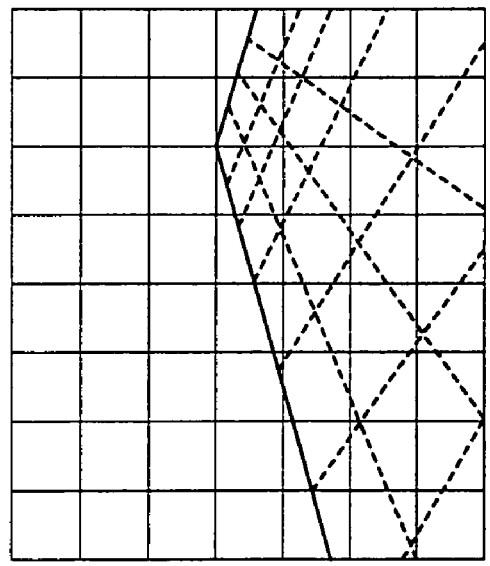

That is to say, the camera No. 1 image data may be classified into three types of blocks BL1, BL2 and BL3 as shown in FIGS. 6A and 6B. Specifically, the block BL1 is not necessary for the image synthesis, the block BL2 requires highresolution image data and the block BL3 needs only lowresolution image data.

By reference to the data stored on the mapping table 220, the resolution specifier 260 derives resolutions data Rxv (K, L) and Rxh (K, L) for each macroblock, where x is the camera number (i.e., $1 \leq x \leq X$) and h and v are horizontal and vertical directions, respectively. Hereinafter, it will be described in detail with reference to FIG. 7 how to derive the resolution data Rxv (K, L) and Rxh (K, L).

First, by reference to the data stored on the mapping table 220, it is determined whether or not any point in a macroblock of each camera image has its associated coordinates on the synthesized image. The block BL1, including no points associated with any sets of coordinates on the synthesized image, is not necessary for the image synthesis. Accordingly, the resolution data Rxv (K, L) and Rxh (K, L) for every point in the block BL1 should be zero.

Figure 7C:
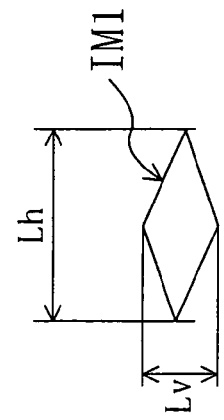
FIGS. 7A, 7B and 7C illustrate an exemplary method of deriving resolution data.
Figure 7B:
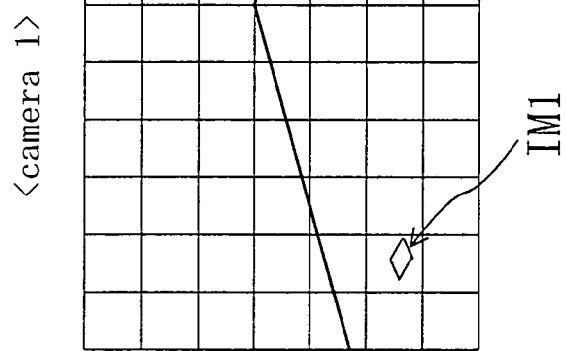
Figure 7A:
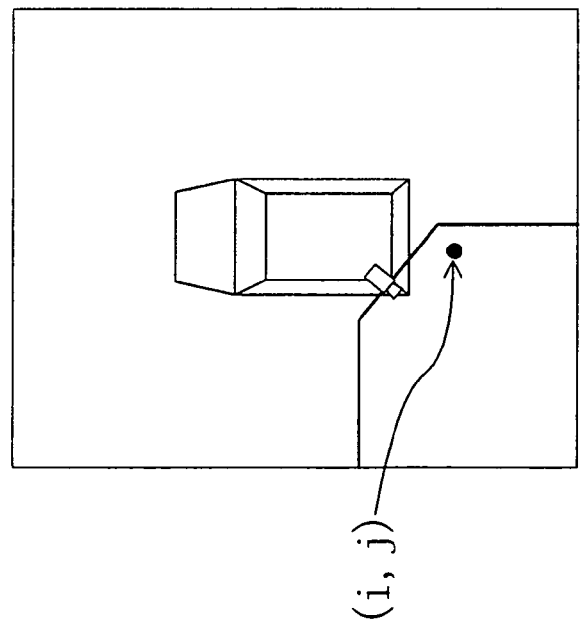

If any point (i', j') associated with coordinates (i, j) on the synthesized image shown in FIG. 7A exists on a macroblock of the camera image, then three more points, respectively associated with the coordinates (i+1, j), (i+1, j+1) and (i, j+1) on the synthesized image, are obtained for the macroblock. Then, an area IM1, surrounded by the point (i', j') and the three other points, is defined as shown in FIG. 7B. Next, using the vertical and horizontal sizes Lv and Lh (which are integers) of the area IM1 shown in FIG. 7C, the resolution data Rxv (K, L) and Rxh (K, L) is derived by the following equations:

$$Rxv(K, L) = 8/Lv$$

$$Rxh(K, L) = 8/Lh$$

where the remainder should be rounded up. The resolution specifier 260 transmits the resolution data R1v (K, L) through RXv (K, L) and R1h (K, L) through RXh (K, L) obtained this way to the compressors 120 for the respective cameras 110 through the transmission line 15.

Strictly speaking, the area of the camera image occupied by the four pixels associated with the coordinates (i, j) on the synthesized image is not equal to the area IM but actually an area surrounded by the four points associated with the coordinates (i−0.5, j−0.5), (i−0.5, j+0.5), (i+0.5, j−0.5) and (i+0.5, j+0.5), respectively, on the synthesized image. However, the latter area has almost the same shape as the area IM1 and the points associated with the coordinates (i, j), (i+1, j), (i+1, j+1) and (i, j+1) on the synthesized image can be easily obtained by reference to the mapping table 220. For that reason, the resolution data Rxv (K, L) and Rxh (K, L) is herein derived based on the size of the area IM.

In accordance with the resolution data Rxv (K, L) and Rxh (K, L) transmitted, each compressor 120 removes unnecessary components from the signal gx (K, L, m, n) with respective frequencies for each macroblock of the associated camera image. Then, the compressor 120 transmits only the necessary components to the image processing section 20. Specifically, the compressor 120 removes components with m values greater than Rxv (K, L) and n values greater than Rxh (K, L). In this case, the resolution data Rxv (K, L) and Rxh (K, L) of each and every point in the block BL1 is zero. Accordingly, all the components in the block BL1 are removed.

Figure 8:
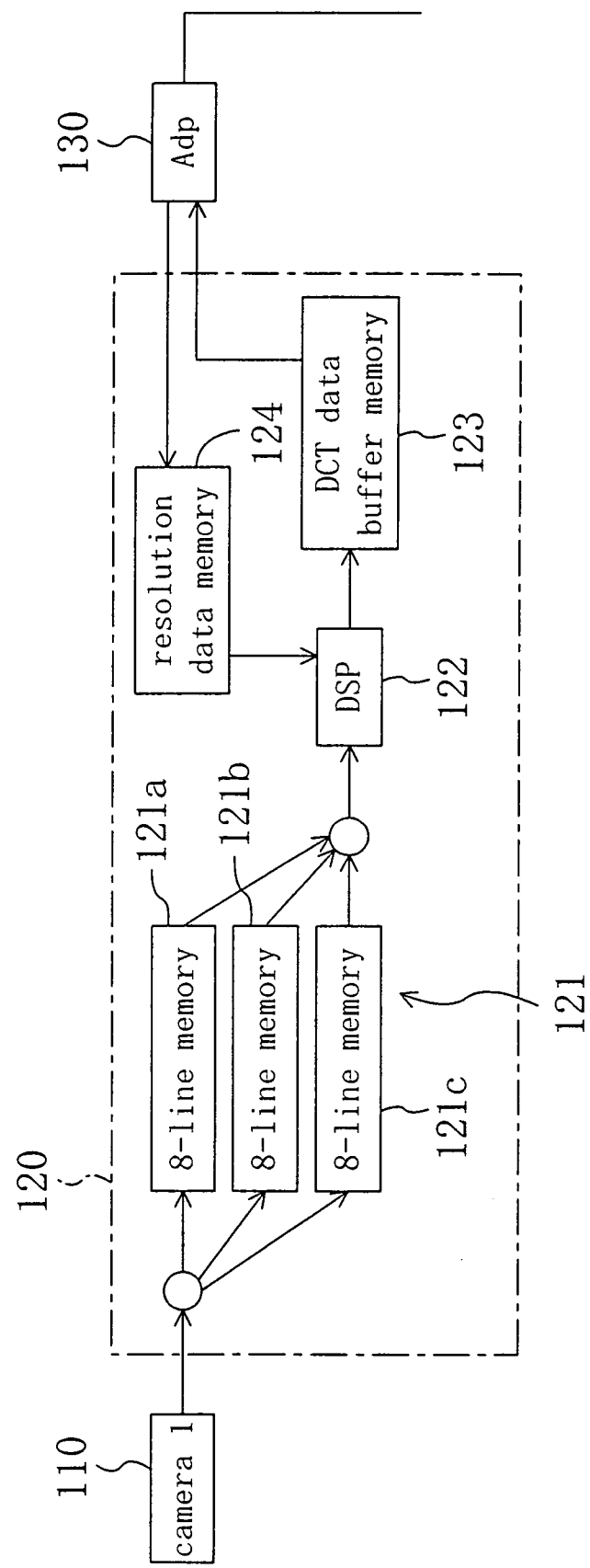
FIG. 8 is a block diagram illustrating an exemplary internal configuration for a compressor according to the first embodiment.

FIG. 8 illustrates an exemplary internal configuration for the compressor 120 associated with the camera No. 1. The compressor 120 includes three 8-line memories 121a, 121b and 121c and can store image signals corresponding to 24(=8×3) lines in total.

When the resolution data R1v (K, L) through RXv (K, L) and R1h (K, L) through RXh (K, L) arrives by way of the transmission line 15, each transmission adapter 130 selectively receives the resolution data for the associated camera. In the illustrated example, the transmission adapter 130 receives the resolution data R1v (K, L) and R1h (K, L) associated with the camera No. 1. Then, the transmission adapter 130 stores the resolution data on a resolution data memory 124.

On the other hand, the camera 110 is sending out image signals as time-series data along the scan lines just like TV signals. Accordingly, a time t, at which a signal associated with a set of coordinates (i, j) on the screen are input, is given by $$t = T\,\text{pix} \cdot (i \cdot (720 + Bh) + j)$$

where Tpix is a time per pixel and Bh is the number of horizontal blanking pixels.

The image signals, sent out from the camera 110, are sequentially stored on the respective 8-line memories 121a, 121b and 121c. In this case, part of the image signal associated with an $i^{th}$ line is stored at a mod $(i, 24)^{th}$ line. As used herein, mod (K, L) means the remainder obtained by dividing K by L.

When the first image signal has been stored to the eighth line on the first 8-line memory 121a, the next image signal for the ninth and succeeding lines starts to be stored on the second 8-line memory 121b. On the other hand, a digital signal processor (DSP) 122 reads out the image signal, corresponding to the number 8×720 of pixels, as a signal S1 (1, L, i', j') (where $1 \leq L \leq 90$, $1 \leq i' \leq 8$ and $1 \leq j' \leq 8$) for ninety 8×8 pixel macroblocks from the first 8-line memory 121a. Then, the DSP 122 performs the DCT transform on each of these macroblocks, thereby calculating g1 (1, L, m, n). Furthermore, by using the resolution data R1v (1, L) and R1h (1, L) stored on the resolution data memory 124, the DSP 122 removes all components with m values greater than R1v (1, L) and with n values greater than R1h (1, L) from g1 (1, L, m, n).

Accordingly, at this point in time, the image signal S1 (i, j) (where $1 \leq i \leq 8$ and $1 \leq j \leq 720$) stored on the first 8-line memory 121a is the following data sequence:

$$g1(K=1, 1 \leq L \leq 90)$$

$$(L=1): d1, d2, \ldots, dmn$$

$$(L=2): d1, d2, \ldots, dmn'$$

$$(L=90): d1, d2, \ldots, dmn''$$

where mn=R1v (1, 1) ·R1h (1, 1), mn'=R1v (1, 2)·R1h (1, 2) and mn''=R1v (1, 90)·R1h (1, 90). As can be seen, the respective macroblocks include mutually different numbers of data items. That is to say, the image signal stored on the first 8-line memory 121a is transformed into a data sequence in which each macroblock includes a number (R1v (1, L)·R1h (1, L)) of data items. This data sequence is once stored on a DCT data buffer memory 123 and then trans-mitted by the transmission adapter 130 to the image processing section 20 by way of the transmission line 15.

On receiving this data sequence, the expander 240 performs inverse DCT (IDCT) transform on the data sequence, thereby restoring the image signal as S1' (1, L, i', j'). Then, the expander 240 stores the restored image signal on the buffer memory 230. The restored image signal S1, (1, L, i', j') has already had its high-frequency components removed during the DCT transform and is equivalent to a signal obtained by subjecting the original signal S1 (1, L, i', j') to low pass filtering (LPF) processing.

Next, when the second image signal has been stored to the sixteenth line on the second 8-line memory 121b, the next image signal for the seventeenth and succeeding lines starts to be stored on the third 8-line memory 121c. On the other hand, the DSP 122 reads out the image signal, corresponding to the number 8×720 of pixels, as a signal S1 (2, L, i', j') (where $1 \leq L \leq 90$, $1 \leq i' \leq 8$ and $1 \leq j' \leq 8$) for ninety 8×8 pixel macroblocks from the second 8-line memory 121b. Then, the DSP 122 performs the DCT transform on each of these macroblocks, thereby deriving g1 (2, L, m, n). Furthermore, by using the resolution data R1v (2, L) and R1h (2, L) stored on the resolution data memory 124, the DSP 122 removes all components with m values greater than R1v (2, L) and with n values greater than R1h (2, L) from g1 (2, L, m, n).

Accordingly, at this point in time, the image signal stored on the second 8-line memory 121b is the following data sequence:

$$g1(K=2, 1 \leq L \leq 90)$$

$$(L=1): d1, d2, \ldots, dmn$$

$$(L=2): d1, d2, \ldots, dmn'$$

$$(L=90): d1, d2, \ldots, dmn''$$

where mn=R1v (2, 1)·R1h (2, 1), mn'=R1v (2, 2)·R1h (2, 2) and mn''=R1v (2, 90)·R1h (2, 90). As can be seen, the respective macroblocks include mutually different numbers of data items. That is to say, the image signal stored on the second 8-line memory 121b is transformed into a data sequence in which each macroblock includes a number (R1v (2, L)·R1h (2, L)) of data items. In the same way, this data sequence is also transmitted through the transmission line 15 to the image processing section 20 and then restored by the expander 240 into an image signal S1' (2, L, i', j').

The same operation will be repeatedly performed until K=60. In this manner, image signals S1' (K, L, i', j') corresponding to one frame are restored and then stored on the buffer memory 230.

Also, the compressor 120 associated with each of the other cameras 110 also transmits compressed image data to the expander 240, which also restores image signals Sx' (K, L, i', j') (where $2 \leq x \leq X$) and then stores them on the buffer memory 230. Then, the image synthesizer 210 produces a synthesized image from the respective camera image data stored on the buffer memory 230 by the known method.

As described above, the camera section 10 of this embodiment compresses the image data of each camera image and then transmits just a part of the image data with specified resolutions in accordance with the correspondence between the synthesized and respective camera images as described on the mapping table 220. Accordingly, the transmission line 15 may have a smaller channel capacity. As a result, the monitoring system ensures more stabilized data transmission and can use an even less expensive transmission line.

Figure 9:
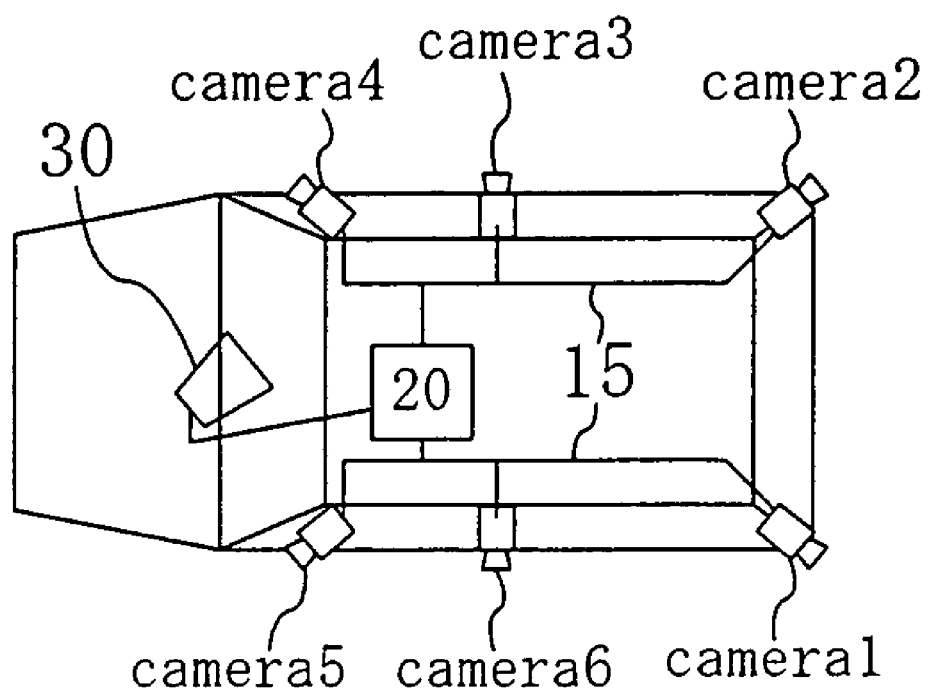
FIG. 9 illustrates another exemplary arrangement of cameras on a vehicle.

That is to say, the transmission lines for the respective cameras can be easily integrated into just one transmission line 15 as shown in FIG. 2. Thus, the transmission line 15 is much easier to mount on a vehicle and needs maintenance much less often. Alternatively, as shown in FIG. 9, the transmission line 15 may also be divided into two depending on the positions of the cameras mounted. That is to say, the monitoring system of this embodiment can cope with various situations flexibly enough. And this system is also much easier to install on a vehicle or requires much less maintenance.

The transmission path does not have to be the transmission line 15 but may also be a wireless path. This embodiment is also very effectively applicable to even a situation like that. That is to say, the channel capacity required can also be so small that the wireless transmission path is implementable using less expensive parts. In addition, compared to the wired path, the wireless path can be installed on a vehicle and maintained even more easily.

Also, part of a camera image that is not necessary for image synthesis (e.g., the block BL1 shown in FIG. 6B) needs to have resolution data Rxv (K, L) and Rxh (K, L) of (0, 0), and the number of data items in this block is zero. Accordingly, the amount of image data to be transmitted through the transmission line 15 can be reduced considerably.

Moreover, in the image processing section 20, only a part of the image data with required resolutions should be stored for each camera image on the buffer memory 230. Thus, the buffer memory 230 may have a storage capacity much smaller than that of a known one.

Furthermore, as soon as each camera image signal has been stored on one of the 8-line memories 121a, 121b and 121c, the compressor 120 starts to perform the DCT transform and transmission. Accordingly, the compression and transmission causes a minimum signal propagation delay.

In addition, the operation of compressing each camera image may also have its modes changed depending on the type of the synthesized image to be produced by the image processing section 20. In that case, every time the mapping tables for use in image synthesis are changed, the resolution specifier 260 should newly obtain the resolution data Rxv (K, L) and Rxh (K, L) and then transmit it to the compressors 120 for the respective cameras 110 through the transmission line 15.

Alternatively, resolution data sets corresponding to the respective mapping tables may also be stored beforehand on a ROM, for example, provided for the resolution specifier 260. In that case, the selection signal should also be input to the resolution specifier 260 so that the resolution specifier 260 can change the resolution data sets when the mapping tables are changed in response to the selection signal. Then, there is no need to perform the process step of newly obtaining the resolution data every time the mapping tables are changed.

As another alternative, the compressor 120 may also include a memory for pre-storing the resolution data sets, corresponding to the respective mapping tables, thereon. Then, every time the mapping tables are changed, the image processing section 20 has only to send the ID of the mapping table newly selected to the compressors 120. Alternatively, instead of getting the mapping table ID sent from the image processing section 20, the selection signal may also be input to the respective compressors 120 in the camera section 10 so that the compressors 120 can change the resolution data sets every time the mapping tables are changed.

In the foregoing embodiment, a DCT transform is supposed to be carried out to compress the image data. Optionally, the DCT transformed data may be further subjected to quantization in compliance with the JPEG, for example. Also, similar effects are attainable by a wavelet or Fourier transform, not just by the DCT transform.

Elimination of Aliasing Distortion

In addition, according to this embodiment, it is possible to easily avoid an undesirable situation where the synthesized image has its quality lowered by aliasing distortion.

In the example shown in FIGS. 7A and 7B, the area IM1 on the camera image, corresponding to the coordinates (i, j) on the synthesized image, has a size greater than that of one pixel of the camera image. That is to say, the area IM1 contains a number of pixels. To obtain an optically accurate synthesized image, a weighted average of the data represented by those pixels contained in the area IM1 should be obtained as the pixel data corresponding to the coordinates (i, j). Specifically, the pixel data S (i, j) of the synthesized image should be given by $$S(i, j) = \Sigma \gamma_p \cdot (S1(i_p, j_p))$$

where S1 $(i_p, j_p)$ is the camera pixel data, p is the number of camera pixel and $\gamma_p$ is a coefficient that has been determined considering the percentage of the pixel included in the area IM1. In that case, however, to obtain a signal corresponding to one pixel of the synthesized image, the computation should be carried out with signals corresponding to multiple pixels read out from the buffer memory 230. This method is far from being practical because the image synthesizer 210 must perform a huge amount of computation.

For that reason, a so-called "nearest" approximation method has been used in the art. According to the nearest method, only a signal corresponding to just one pixel located nearest to the center of the area IM1 is used as the signal corresponding to the coordinates (i, j).

The nearest method, however, often results in aliasing distortion, which is typically observed when a signal that was sampled at a high rate is sub-sampled at a low sampling rate without cutting off the high-frequency components thereof. That is to say, if simplified image synthesis is carried out by the nearest method using a high-resolution image signal as it is, then the aliasing distortion might arise in part of the image that may have a low resolution, thus possibly lowering the quality of the synthesized image.

Figure 10:
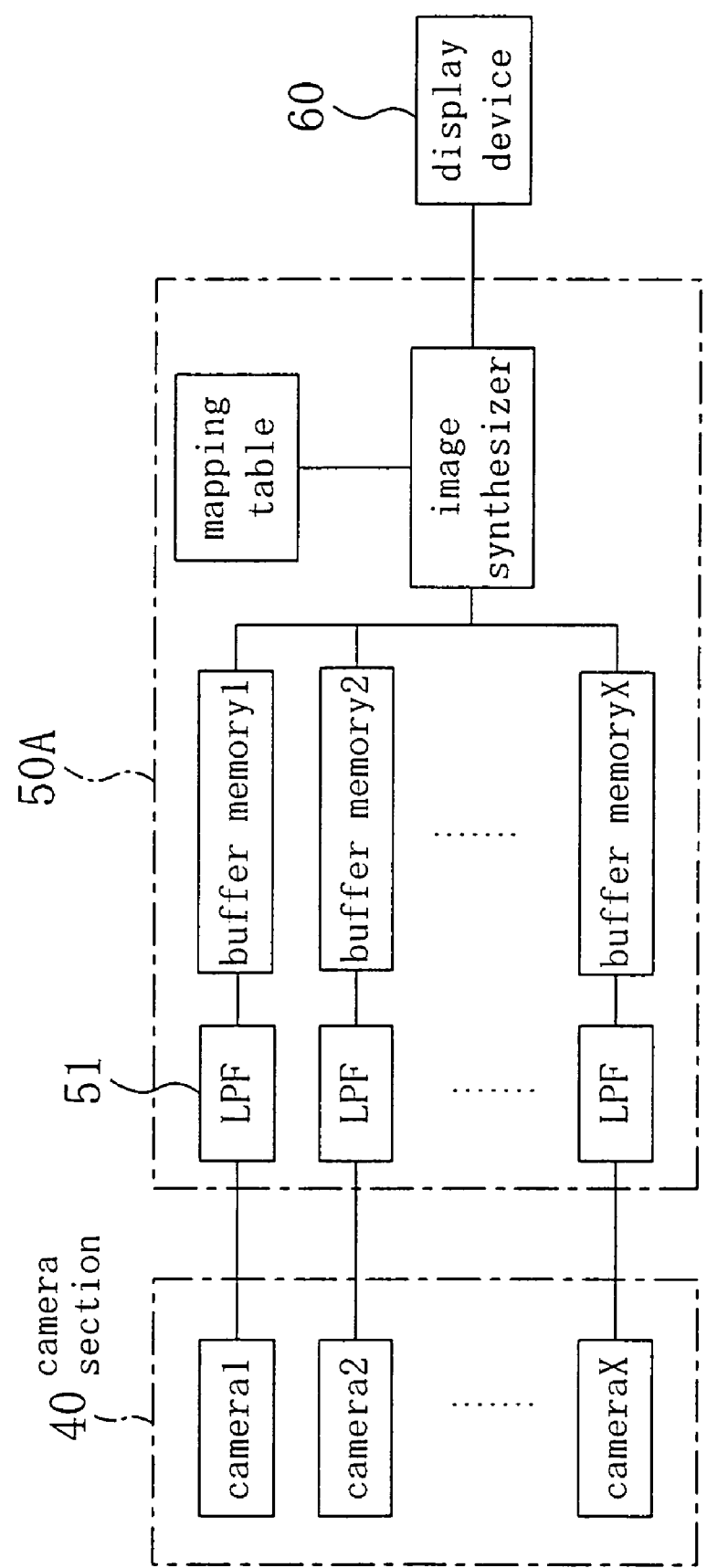
FIG. 10 is block diagram illustrating, as a comparative example, a monitoring system with an image processing section including LPFs.

To eliminate the aliasing distortion, those unwanted high-frequency components could be cut off in advance by getting the image signal of each camera pre-processed by its associated low-pass filter (LPF) 51 as shown in FIG. 10.

In that case, however, each LPF 51 should have its frequency characteristics controlled adaptively to every part of the associated camera image, because a resolution necessary for a part of the camera image might be different from one required for another part thereof. That is to say, the LPF 51 should have a rather complicated circuit configuration. On the other hand, if an LPF exhibiting constant frequency characteristics is used, then the LPF may have a simple circuit configuration. But the LPF automatically cuts off the high-frequency components from even a part requiring a high resolution. Accordingly, the resultant synthesized image cannot have the required resolutions fully.

In contrast, according to this embodiment, the aliasing distortion much less likely arises in the low-resolution image portion, although the aliasing distortion often occurs there normally. This is because the compressor 120 has already removed those high-frequency components from that image portion according to the size of the area IM1. That is to say, the camera image signal, restored by the expander 240, is equivalent to a version of the original signal that has been subjected to the LPF processing adaptively depending on the resolutions required. Thus, the monitoring system of this embodiment can suppress the aliasing distortion sufficiently and can improve the quality of the resultant synthesized image significantly without using those overly complicated LPFs.

In the foregoing example, the present invention is applied to the nearest method. Alternatively, the present invention is equally applicable to any other method. For example, this invention is obviously applicable to a bilinear method in which linear interpolation is carried out using signals associated with four pixels that surround the center of the area IM1 corresponding to the coordinates (i, j).

Alternative Compression Method

In the foregoing embodiment, the resolution specifier 260 obtains the resolution data Rxv (K, L) and Rxh (K, L) using the horizontal and vertical sizes Lh and Lv of the area IM1 shown in FIG. 7C. Alternatively, the resolution data may also be obtained by a different method.

Figure 11A:
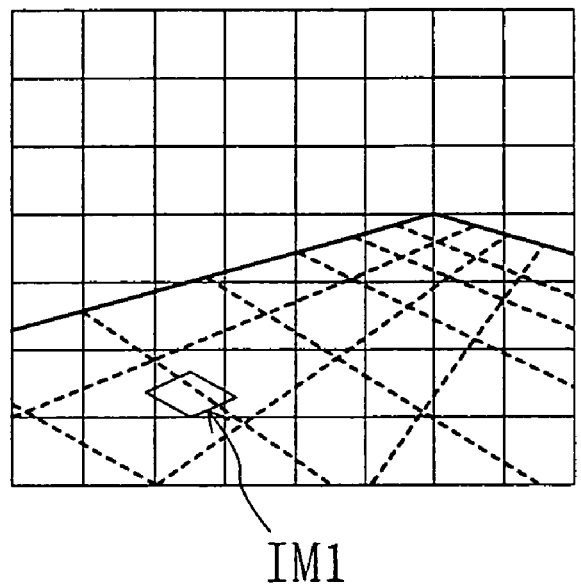
FIGS. 11A and 11B illustrate another exemplary method of deriving resolution data.
Figure 11B:
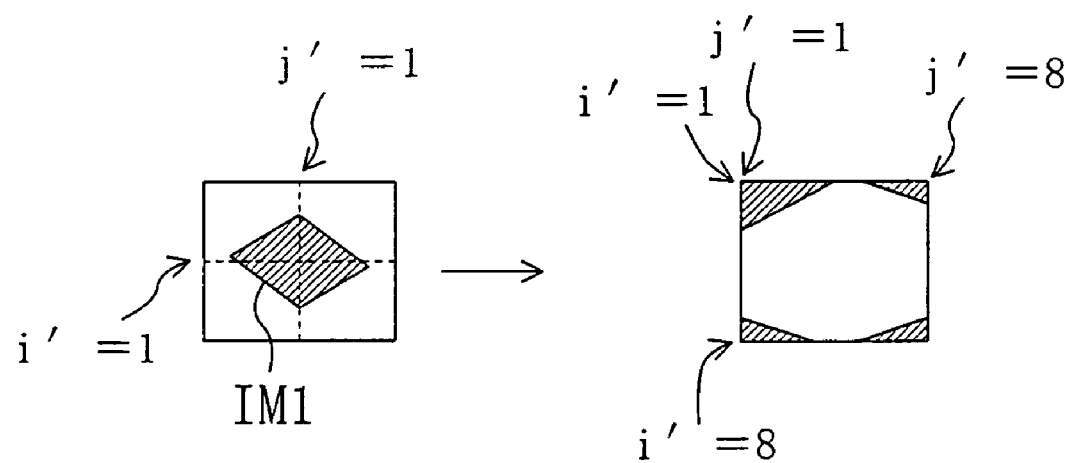

Like FIG. 7B, FIG. 11A also illustrates the area IM1 occupied by one pixel of the synthesized image on the camera image. In this alternative method, the area IM1 is placed at the center of an 8×8 macroblock as shown in FIG. 11B and a coefficient $\gamma_p$ is obtained for each pixel while considering the percentage of the pixel included in the area IM1. When a weighted average of multiple pixels included in a camera image is used to produce an optically accurate synthesized image, this coefficient $\gamma_p$ is used to weight each of those pixels.

Specifically, a coefficient r (i', j') is expanded into a coefficient for the 8×8 macroblock while supposing the center of the area IM1 to be represented by (i', j')=(1, 1). Then, as in an image signal, the coefficient is subjected to a DCT transform, thereby obtaining a transform coefficient h (K, L, m, n). This transform coefficient h (K, L, m, n) is a DCT transform coefficient representing the LPF characteristics shown by the coefficient $\gamma_p$ and has smaller high-frequency components.

Thus, the upper limits of the m and n values in the transform coefficient h (K, L, m, n) with a predetermined threshold value or more are defined as the values of the resolution data Rxv (K, L) and Rxh (K, L). The resolution specifier 260 transmits not only the resolution data Rxv (K, L) and Rxh (K, L) but also the transform coefficient h (K, L, m, n) with the predetermined threshold value or more to the compressor 120.

In response, the compressor 120 removes the high-frequency components from the DCT transformed data gx (K, L, m, n) of the image signal using the resolution data Rxv (K, L) and Rxh (K, L). Next, the compressor 120 multiplies the remaining DCT transformed data gx (K, L, m, n) by a transform coefficient hx (K, L, m, n) and then sends the product to the expander 240.

In accordance with this method, a signal restored by the expander 240 through IDCT transform is approximately equal to a version of the original signal that has been subjected to LPF processing using the coefficient $\gamma_p$. Thus, compared to the first embodiment, a more optically accurate synthesized image can be produced.

It should be noted that the resolution data Rxv (K, L) and Rxh (K, L) is also definable without using the area IM1. For example, a block unnecessary for image synthesis may have resolution data Rxv (K, L) and Rxh (K, L) of zero, while a block necessary for image synthesis may have resolution data Rxv (K, L) and Rxh (K, L) of a fixed non-zero value.

Embodiment 2

Figure 12:
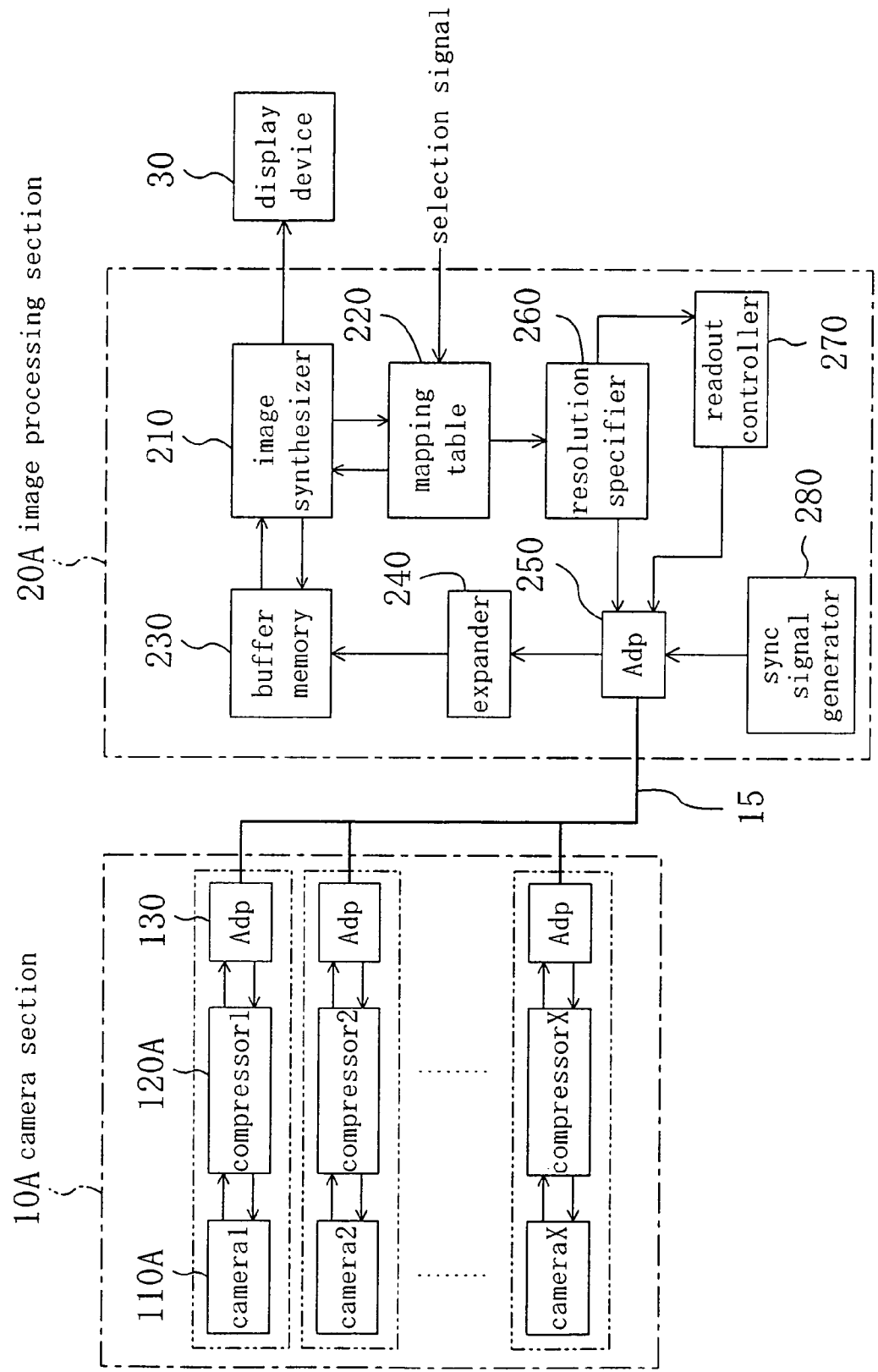
FIG. 12 is a block diagram illustrating a configuration for a monitoring system according to a second embodiment of the present invention.

FIG. 12 is a block diagram illustrating a configuration for a monitoring system according to a second embodiment of the present invention. The monitoring system shown in FIG. 12 is basically the same as the counterpart shown in FIG. 1. In FIG. 12, each component also shown in FIG. 1 is identified by the same reference numeral and the detailed description thereof will be omitted herein.

The system shown in FIG. 12 is different from the counterpart shown in FIG. 1 in that the image processing section 20A of the system shown in FIG. 12 further includes readout controller 270 and sync signal generator 280. In response to the output of the resolution specifier 260, the readout controller 270 generates a readout control signal for each camera 110A. The sync signal generator 280 generates a sync signal for each camera 110A. The readout control and sync signals, output from the readout controller 270 and sync signal generator 280, respectively, are transmitted from the transmission adapter 250 to the camera sections 10A by way of the transmission line 15. The readout control and sync signals transmitted will be sent to the compressors 120A and cameras 110A by way of the respective transmission adapters 130.

Synchronously with the rise of the sync signal transmitted, each camera 110A captures a frame picture. In the illustrated embodiment, each camera 110A is supposed to capture image data consisting of 720×480 pixels every 1/60 second.

Figure 13:
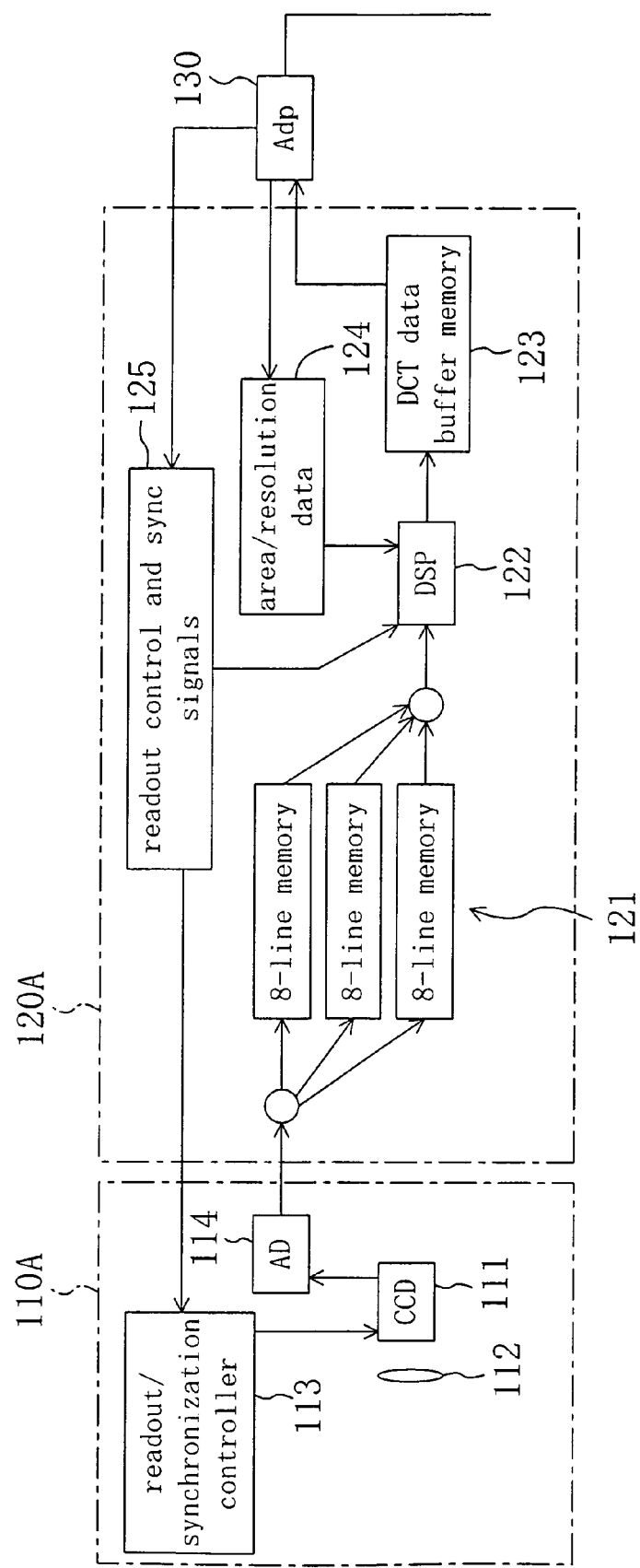
FIG. 13 is a block diagram illustrating an exemplary internal configuration for camera and compressor according to the second embodiment.

FIG. 13 is a block diagram illustrating an exemplary internal configuration for the camera 110A and compressor 120A. As shown in FIG. 13, the camera 110A includes: imager (e.g., CCD in this embodiment) 111; optical system 112 with a lens; readout/synchronization controller 113; and ADC/processor 114. The ADC/processor 114 performs an analog-to-digital conversion on the output of the imager 111 and then various types of signal processing (including color separation) on the resultant digital signal.

The imager 111 includes imaging plane and storage each corresponding to one frame picture. First, incoming light is incident through the optical system 112 onto the imaging plane of the imager 111 and sensed as a light intensity signal thereon. Then, a phototransistor associated with each pixel converts the light intensity signal into an electrical charge signal. The electrical charge signal will be stored for one frame interval (e.g., 1/60 second in this embodiment) and then transferred as an image signal to the storage.

In a normal CCD, the image signal, which has been accumulated on the storage, is sequentially read out along the scan lines. Typically, the upper left corner of one frame picture is read out first. In the meantime, another light intensity signal, which has just been sensed by the imaging plane, is converted into another electrical charge signal, which is then stored as an image signal for the next frame. In contrast, according to this embodiment, the imager 111 can read the image signal either from the upper left or lower left corner of one frame picture. And the order of reading the image signal is controlled by the readout/synchronization controller 113.

In the second embodiment, the image processing section 20A controls the order, in which the image data obtained by each of the cameras 110A is read out, in accordance with the correspondence between the synthesized and respective camera images.

Figure 14:
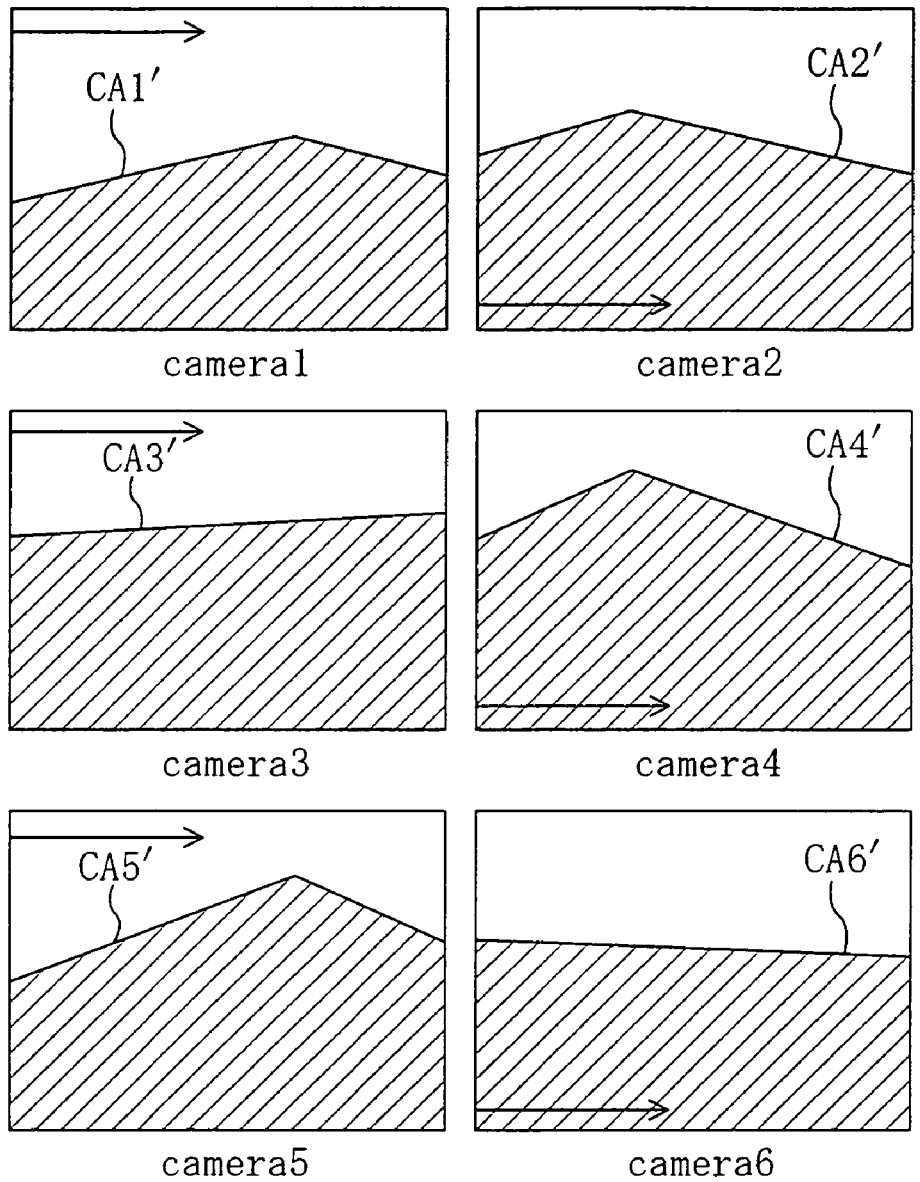
FIG. 14 illustrates an exemplary order in which image signals are read out from respective cameras.

FIG. 14 illustrates an exemplary order in which the image signal is read out from each of the cameras 110A. In FIG. 14, the areas CA1' through CA6' of the respective camera images are the same as the counterparts shown in FIG. 4B and are all necessary for image synthesis. As shown in FIG. 14, the lower part of each camera image is an area necessary for the image synthesis, while the upper part thereof is unnecessary for the image synthesis.

In the illustrated embodiment, the readout controller 270 generates a readout control signal instructing that the image signal captured by the camera No. 1, 3 or 5 should be read out from the upper left corner of one frame picture and that the image signal captured by the camera No. 2, 4 or 6 should be read out from the lower left corner thereof as indicated by the arrows in FIG. 14. In response to the readout control signal 125 transmitted, the readout/synchronization controller 113 for each camera 110A controls the imager 111 as shown in FIG. 13. The output of the imager 111 is A-D converted and then subjected to various types of signal processing like color separation by the ADC/processor 114. Then, the digital signal processed is sequentially sent as image signals to the 8-line memories 121 in the compressor 120A.

As for the image signal captured by the camera No. 1, 3 or 5, a signal corresponding to coordinates (i, j) on a synthesized image is sent at the time t given by $$t = T\text{pix} \cdot (i \cdot (720 + Bh) + j)$$

as in the first embodiment. On the other hand, the image signal captured by the camera No. 2, 4 or 6 is scanned from the lower left corner of one frame picture. Accordingly, unlike the first embodiment, a signal corresponding to coordinates (i, j) on a synthesized image is sent at the time t given by $$t = T\text{pix} \cdot ((480-i) \cdot (720 + Bh) + j)$$

where Tpix is a time per pixel and Bh is the number of horizontal blanking pixels.

Accordingly, as in the first embodiment, the first image signal captured by the camera No. 1 is converted into the following data sequence in which the respective macroblocks have mutually different numbers of data items:

$$g1(K=1, 1 \leq L \leq 90)$$

$$(L=1): d1, d2, \ldots, dmn$$

$$(L=2): d1, d2, \ldots, dmn'$$

$$(L=90): d1, d2, \ldots, dmn''$$

where mn=R1v (1, 1)·R1h (1, 1), mn'=R1v (1, 2)·R1h (1, 2) and mn"=R1v (1, 90)·R1h (1, 90). In contrast, the first image signal captured by the camera No. 2 is converted into the following data sequence in which the respective macroblocks have mutually different numbers of data items:

$$g2(K=60, 1 \leq L \leq 90)$$

$$(L=1): d1, d2, \ldots, dmn$$

$$(L=2): d1, d2, \ldots, dmn'$$

$$(L=90): d1, d2, \ldots, dmn''$$

where mn=R2v (60, 1)·R2h (60, 1), mn'=R2v (60, 2)·R2h (60, 2) and mn"=R2v (60, 90)·R2h (60, 90).

Next, it will be described how much data should be transmitted through the transmission line 15 when compressed image signals are sent out from the respective cameras 110A.

As for the first image signal sent out from the camera No. 1, 3 or 5 for the first eight lines of one frame picture, mn through mn" are almost zero, i.e., only data with almost zero quantity is transmitted therefrom. On the other hand, the first image signal transmitted from the camera No. 2, 4 or 6 for the first eight lines of one frame picture has a considerable amount of data necessary for image synthesis. As for the last image signal sent out from the camera No. 2, 4 or 6 for the last eight lines of one frame picture, mn through mn" are almost zero, i.e., only data with almost zero quantity is transmitted therefrom. On the other hand, the last image signal transmitted from the camera No. 1, 3 or 5 for the last eight lines of one frame picture has a considerable amount of data necessary for image synthesis.

As can be seen, if the image signal is read out from the camera No. 1, 3 or 5 in the order opposite to that of the camera No. 2, 4 or 6, then the amount of data transmitted through the transmission line 15 can be dispersed with time. Accordingly, the transmission line 15 may have a relatively small channel capacity.

Even for the first embodiment, the amount of data transmitted through the transmission line 15 can also be dispersed with time. For example, the DCT data buffer memory 123 in the compressor 120 may have so large a capacity that the data transmission is controllable on the transmitting end of the DCT data buffer memory 123. Then, the amount of data transmitted can be dispersed with time.

In that case, however, a huge amount of data should be stored on the DCT data buffer memory 123 albeit temporarily. Thus, the data transmitted from the camera 110 to the image processing section 20 is delayed for a longer time. Generally speaking, the driver, or the user of this monitoring system, drives his or her vehicle while looking at the synthesized image on the screen. Accordingly, considering the response speed at outputting the synthesized image, such a delay should preferably be as short as possible. Thus, the second embodiment is more advantageous than the first embodiment in this respect.

As described above, according to the second embodiment, an image signal captured by each camera is read out in the order that has been controlled in accordance with the correspondence between the synthesized and camera images. Thus, the amount of data transmitted can be dispersed with time without decreasing the response speed at outputting the synthesized image.

It should be noted that the image signal readout orders shown in FIG. 14 are just illustrative ones. Accordingly, the readout control may also be performed so that the image signal is read out from the upper left corner of a picture taken by the camera No. 1, 2 or 3 and from the lower left corner of a picture taken by the camera No. 4, 5 or 6, for example. Furthermore, if the correspondence between the synthesized and camera images has changed, then the image signal readout order may also be changed. In the foregoing embodiment, the imager 111 is so constructed as to provide two types of readout orders. Alternatively, the imager 111 may also realize three or more types of readout orders. Then, an appropriate one of the readout orders should be selected depending on the correspondence between the synthesized and camera images.

In the foregoing embodiment, a CCD is supposed to be used as the imager. Alternatively, a CMOS device may also be used as the imager. A camera including a CCD outputs an image signal corresponding to the entire frame along the scan lines. On the other hand, a camera including a CMOS device can selectively output an image signal corresponding to just a part of one frame (e.g., a rectangular area). Accordingly, if a camera including a CMOS device is used, the image signal captured by each camera can be read out in a more finely controlled order. As a result, the amount of data transmitted can be dispersed with time more efficiently.

Embodiment 3

Figure 15:
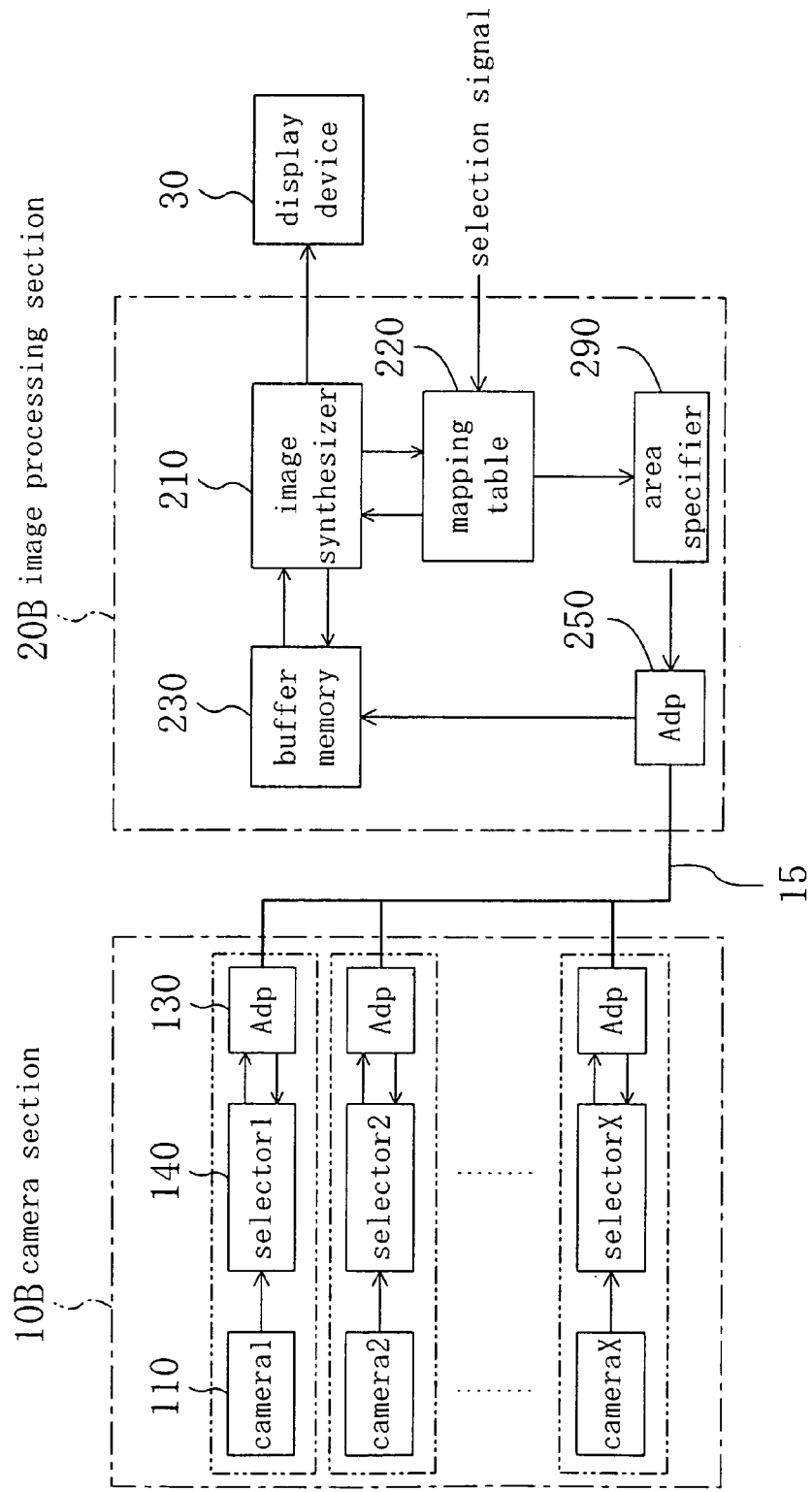
FIG. 15 is a block diagram illustrating a configuration for a monitoring system according to a third embodiment of the present invention.

FIG. 15 is a block diagram illustrating a configuration for a monitoring system according to a third embodiment of the present invention. The monitoring system shown in FIG. 15 has basically the same configuration as the counterpart of the first embodiment shown in FIG. 1.

The third embodiment of the present invention is different from the first embodiment in that the system of the third embodiment cuts down the amount of each camera image by removing the image data of an area that should be unnecessary for image synthesis, not by compressing the image data. For that purpose, the image processing section 20B of the third embodiment includes an area specifier 290 as alternative cutdown mode selecting means instead of the resolution specifier 260. The area specifier 290 specifies the area that should be necessary for image synthesis for each camera image. Also, the camera section 10B of the third embodiment does not include the compressors 120 but selectors 140. Each of the selectors 140 removes the image data from the entire area of the associated camera image but the area specified by the area specifier 290. Furthermore, since this system performs no image compression, the image processing section 20B does not include the expander 240.

In accordance with the correspondence between the synthesized and camera images as described on the mapping table 220, the area specifier 290 specifies the area that should be necessary for image synthesis for each camera image. The information representing the areas specified is transmitted from the transmission adapter 250 to the respective selectors 140 in the camera section 10B by way of the transmission line 15.

In response to the area information provided, each selector 140 selectively outputs the data about only the necessary area of the associated camera image. The image data output is transmitted from the associated transmission adapter 130 to the image processing section 20B by way of the transmission line 15. In the image processing section 20B, the image data transmitted is stored on the buffer memory 230 first. Then, by reference to the data stored on the mapping table 220, the image synthesizer 210 produces a synthesized image from the image data stored on the buffer memory 230.

Figure 17A:
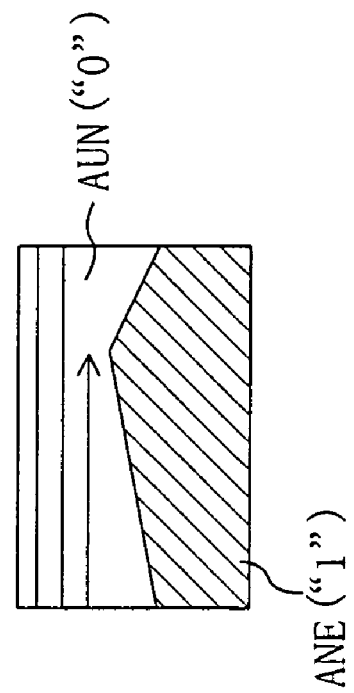
FIGS. 17A and 17B illustrate two methods of specifying an area necessary for image synthesis.

FIGS. 16A and 16B schematically illustrate a relationship between the image taken by the camera No. 1 and an area ANE necessary for image synthesis. As shown in FIG. 16B, the area ANE necessary for image synthesis can be obtained from the location of the synthesized image map on the camera No. 1 image shown in FIG. 16A. For example, the area specifier 290 obtains a rectangular area AN1 including the necessary area ANE as shown in FIG. 17A, and then outputs the coordinates (Is, Js) and (Ie, Je) at the upper left and lower right corners of the rectangular area AN1 as information representing the area AN1. In the same way, the area specifier 290 also defines a similar rectangular area, which should be necessary in producing a synthesized image, for each of the other camera images and then outputs the coordinates at the upper left and lower right corners of the rectangular area obtained.

Figure 18:
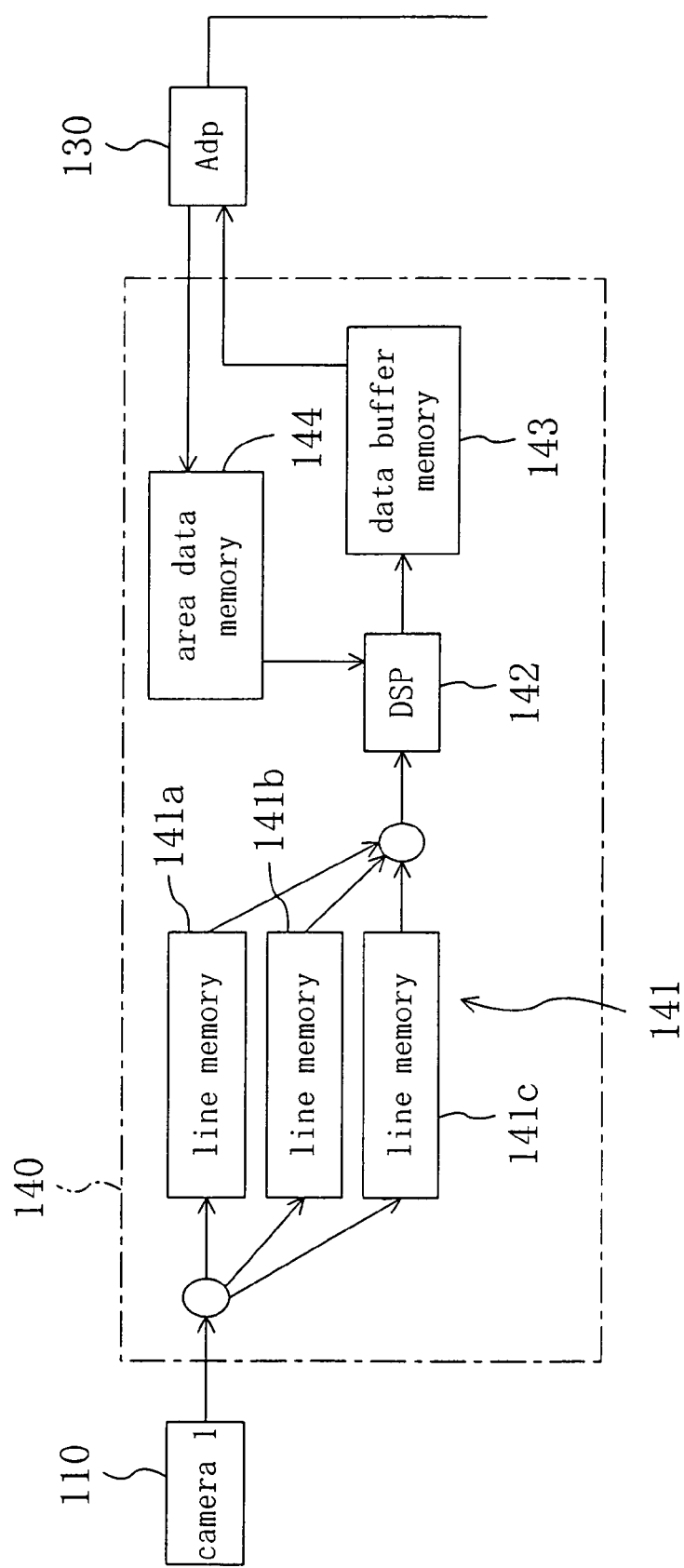
FIG. 18 is a block diagram illustrating an exemplary internal configuration for a selector according to the third embodiment.
Figure 19:
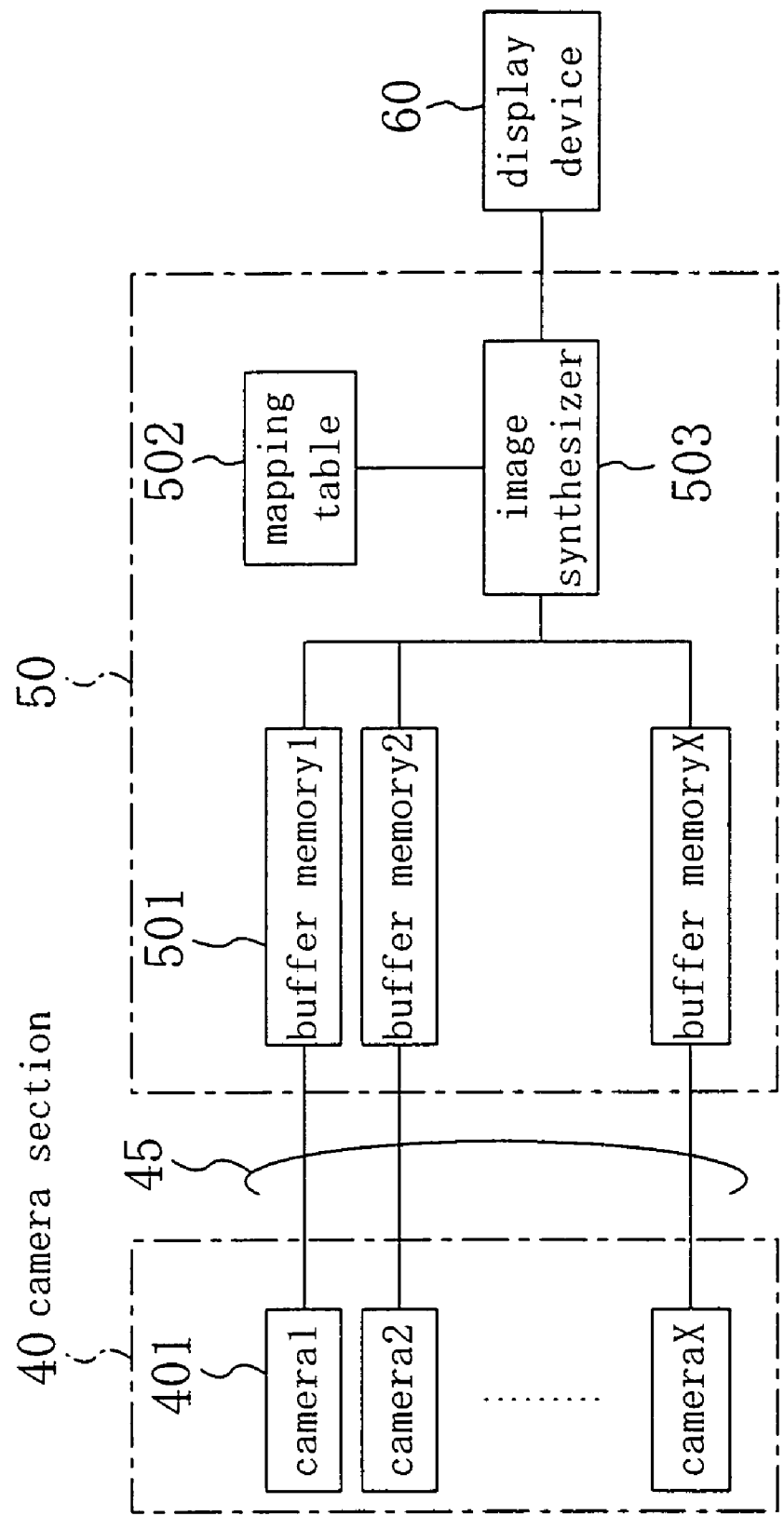
FIG. 19 is a block diagram illustrating a configuration for a known monitoring system.

FIG. 18 is a block diagram illustrating an exemplary internal configuration for the selector 140. Hereinafter, it will be described with reference to FIG. 18 how the selector 140 operates.

The image signals output from the camera 110 are sequentially written onto three line memories 141a, 141b and 141c. On the other hand, area data, representing the areas specified for the respective camera images, has been transmitted through the transmission line 15 to the transmission adapters 130. Each of the adapters 130 selectively takes only a part of the area data for the associated camera 110 and then gets the area data stored on an area data memory 144.

When a predetermined amount of image data has been written on one of the line memories 141a, 141b or 141c, a DSP 142 reads out the image data from the line memory 141a, 141b or 141c. Next, the DSP 142 selects only a part of the image data that should be included in a rectangular area as defined by the area data stored on the area data memory 144, and then gets the selected image data stored on a data buffer memory 143. The image data stored on the data buffer memory 143 is additionally provided with camera number, line numbers and headers representing the numbers of data items as follows:

(Camera No. 1 )(Line No. 1 )(No. of Data M1 ): d1, . . . , dM1

(Camera No. 1 )(Line No. 2 )(No. of Data M2 ): d1, . . . , dM2

(Camera No. 1 )(Line No. 480 )(No. of Data M480 ): d1, . . . , dM480

Then, the image data with these identifiers is transmitted from the transmission adapter 130 to the image processing section 20B by way of the transmission line 15.

The number Mi of data items for a line No. i is given by $$Mi = Je - Js + 1 \text{ if } Is \leq i \leq Ie$$

$$Mi = 0 \text{ otherwise}$$

That is to say, the amount of image data to be transmitted through the transmission line can be cut down considerably compared to a known method that supposes that the image data should be all transmitted.

Figure 17B:
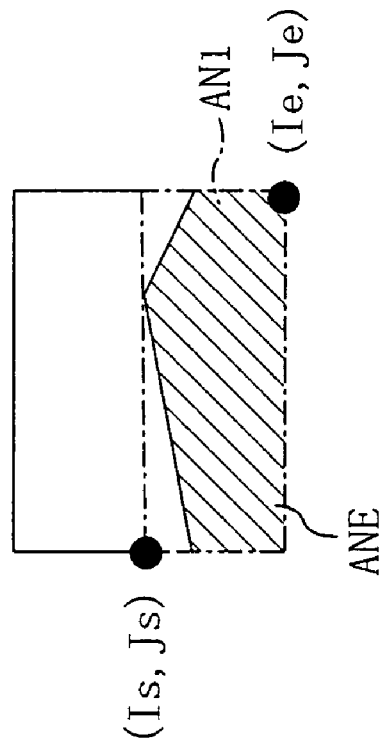

In the foregoing embodiment, the area specifier 290 defines a rectangular area AN1 including an area ANE necessary for image synthesis and then transmits coordinate information, representing the rectangular area AN1, to the respective selectors 140. However, the present invention is not limited to such a specific embodiment. For example, as shown in FIG. 17B, each camera image may be digitized with the area ANE necessary for image synthesis represented as "1" and the unnecessary area AUN represented as "0". In that case, run length data, obtained by scanning the camera image along horizontal scan lines, may be transmitted. Then, in accordance with the run length data transmitted, each selector 140 selectively transmits only a part of its associated camera image data, corresponding to the area ANE, to the image processing section 20B.

Also, as in the first embodiment, the operation of selecting a necessary area from each camera image may also have its modes changed depending on the type of a synthesized image to be produced by the image processing section 20B. In that case, every time the mapping tables for use in image synthesis are changed, the area specifier 290 should newly obtain the area data representing the areas necessary for the image synthesis and then transmit it to the selectors 140 for the respective cameras 110 through the transmission line 15.

Alternatively, area data sets, corresponding to the respective mapping tables, may also be stored beforehand on a ROM, for example, provided for the area specifier 290. In that case, the selection signal should also be input to the area specifier 290 so that the area specifier 290 can change the area data sets when the mapping tables are changed in response to the selection signal. Then, there is no need to perform the process step of newly obtaining the area data every time the mapping tables are changed.

As another alternative, the selector 140 may also include a memory for pre-storing the area data sets, corresponding to the respective mapping tables, thereon. Then, every time the mapping tables are changed, the image processing section 20B has only to send the ID of the mapping table newly selected to the selectors 140. Alternatively, instead of getting the mapping table ID sent from the image processing section 20B, the selection signal may also be input to the respective selectors 140 in the camera section 10B so that the selectors 140 can change the area data sets every time the mapping tables are changed.

It should be noted that the third embodiment of the present invention is combinable with the second embodiment. That is to say, the readout controller 270 and sync signal generator 280 of the second embodiment may be added to the image processing section 20B shown in FIG. 15 to control the camera image readout order in a similar manner.

In the foregoing embodiments, the resolution or area specifier 260 or 290 is included in the image processing section 20, 20A or 20B. Alternatively, the camera section 10 or 10A may include means equivalent to the resolution specifier 260 and the camera section 10B may include means equivalent to the area specifier 290.

In that case, every time the types of synthesized images to be produced are changed, the image processing section 20, 20A or 20B should transmit the data stored on the mapping table 220 newly selected to the camera section 10, 10A or 10B by way of the transmission adapter 250 and transmission line 15. Also, the camera section 10, 10A or 10B may also include a memory for pre-storing the resolution or area data sets, corresponding to the respective mapping tables, thereon. Then, every time the types of synthesized images to be produced are changed, the image processing section 20, 20A or 20B has only to send the ID of the mapping table newly selected to the camera section 10, 10A or 10B. Alternatively, instead of getting the mapping table ID sent from the image processing section 20, 20A or 20B, the selection signal may also be input to the camera section 10, 10A or 10B so that the camera section 10, 10A or 10B can change the resolution or area data sets every time the mapping tables are changed.

Like the resolution or area specifier 260 or 290, the readout controller 270 and sync signal generator 280 of the second embodiment may also be included in the camera section 10, 10A or 10B.

In the foregoing embodiments, the camera images taken by the cameras are all supposed to be used for image synthesis. However, only some of those camera images might be necessary for image synthesis. In that case, the mode of cutting down the amount of data transmitted, including specifying the resolutions or areas required, should be selected for only those camera images necessary for image synthesis.

Also, in the foregoing embodiments, the compressors 120 or selectors 140 are provided as image data cutdown means for all the cameras. However, the compressors 120 or selectors 140 may be provided for just some of the cameras. That is to say, some cameras may have the compressors 120 or selectors 140 and the other cameras may have no compressors 120 or selectors 140. In that case, the mode of cutting down the amount of data transmitted, including specifying the resolutions or areas required, should be selected for only those cameras that do include the compressors 120 or selectors 140 and are necessary for image synthesis.

In the foregoing description, the monitoring system of the present invention is supposed to be applied to vehicles. However, the present invention is equally applicable to any other types of moving objects including airplanes, boats and ships. Furthermore, cameras for the inventive monitoring system may be placed on a still object to be monitored, e.g., shops, residences and showrooms. Moreover, the positions and number of cameras to be mounted are not limited to the illustrated ones.

Furthermore, part or all of the functions of the inventive monitoring system may be implementable by either dedicated hardware or software programs. It is also possible to use a storage or transmission medium that stores thereon a program for getting the inventive image processing executed by a computer either partially or entirely.

As described above, according to the present invention, image data, captured by respective cameras, has its amount cut down in a mode that has been selected in accordance with a correspondence between a synthesized image to be produced and the respective camera images. Then, the image data in the reduced amount is transmitted from the cameras to an image processing section by way of a transmission path. In this manner, the amount of image data to be transmitted can be cut down considerably without sacrificing the quality of the resultant synthesized image. As a result, the transmission path is implementable as a smaller number of less expensive transmission lines or even as a wireless path. That is to say, the transmission path is much easier to mount on a vehicle or requires maintenance much less often. In addition, a buffer memory required for the image processing section can also have its storage capacity reduced greatly. The amount of image data to be transmitted can be cut down either by compressing the image data according to the resolutions that should be necessary for image synthesis or by removing the image data entirely but the areas necessary for the image synthesis.

What is claimed is:

1. A monitoring system comprising:
    a camera section including multiple cameras and image data cutdown means, the image data cutdown means reducing the amount of original image data representing camera images captured by the multiple cameras, the camera section outputting the reduced image data;
    a transmission path for transmitting the reduced image data that has been output from the camera section; and
    an image processing section, which receives the reduced image data through the transmission path and produces a synthesized image from the reduced image data,
    wherein the camera section or the image processing section includes cutdown mode selecting means for selecting a cutdown mode, which specifies the way of reducing data amount of each of the camera images for use in image synthesis, for the image data cutdown means in accordance with a geometric correspondence between the synthesized image and the each of camera images.

2. The system of claim 1, wherein the image processing section selectively produces any of multiple types of synthesized images and changes the types of the synthesized images to be produced, and wherein the cutdown mode selecting means changes the cutdown modes according to the type of the synthesized image to be produced by the image processing section.

3. The system of claim 1, wherein the cutdown mode selecting means comprises a resolution specifier for specifying resolutions that should be necessary for respective areas of each said camera image for use in the image synthesis to produce the synthesized image, and wherein the image data cutdown means compresses the original image data, representing the camera images for use in the image synthesis, according to the resolutions specified by the resolution specifier.

4. The system of claim 3, wherein the image data cutdown means compresses the original image data by discrete cosine transform.

5. the system of claim 1, wherein the cutdown mode selecting means comprises an area specifier for specifying areas that should be necessary to produce the synthesized image for each said camera image for use in the image synthesis, and wherein the image data cutdown means removes an unnecessary part from the original image data that represents each said camera image for use in the image synthesis, the unnecessary part corresponding to the remaining area of the camera image other than the areas specified by the area specifier.

6. The system of claim 1, wherein the original image data is read out from each said camera in a controllable order, and wherein the camera section or the image processing section comprises a readout controller for controlling the order, in which the original image data representing each said camera image for use in the image synthesis is read out, in compliance with the cutdown mode selected by the cutdown mode selecting means.

7. The system of claim 1, wherein the cameras are mounted on a vehicle to capture images of the vehicle's surroundings.

* * * * *

UNITED STATES PATENT AND TRADEMARK OFFICE
CERTIFICATE OF CORRECTION

| | | |
|---|---|---|
| PATENT NO. | : 7,027,616 B2 | Page 1 of 1 |
| APPLICATION NO. | : 09/898335 | |
| DATED | : April 11, 2006 | |
| INVENTOR(S) | : Hirofumi Ishii et al. | |

It is certified that error appears in the above-identified patent and that said Letters Patent is hereby corrected as shown below:

In the Claims:

Column 21

Line 17, Claim 5: "the" first instance, should be --The--

Signed and Sealed this

Fourteenth Day of November, 2006

JON W. DUDAS
*Director of the United States Patent and Trademark Office*